(12) United States Patent
Shaull

(10) Patent No.: US 10,884,869 B2
(45) Date of Patent: Jan. 5, 2021

(54) BACKUP AND RESTORE IN A DISTRIBUTED DATABASE UTILIZING CONSISTENT DATABASE SNAPSHOTS

(71) Applicant: NuoDB, Inc., Cambridge, MA (US)

(72) Inventor: Ross R. Shaull, Waltham, MA (US)

(73) Assignee: NuoDB, Inc., Cambridge, MA (US)

( * ) Notice: Subject to any disclaimer, the term of this patent is extended or adjusted under 35 U.S.C. 154(b) by 661 days.

(21) Appl. No.: 14/688,396

(22) Filed: Apr. 16, 2015

(65) Prior Publication Data

US 2016/0306709 A1 Oct. 20, 2016

(51) Int. Cl.
*G06F 11/14* (2006.01)
*G06F 16/27* (2019.01)
*G06F 16/21* (2019.01)
*G06F 16/23* (2019.01)

(52) U.S. Cl.
CPC ........ *G06F 11/1458* (2013.01); *G06F 16/219* (2019.01); *G06F 16/2365* (2019.01); *G06F 16/27* (2019.01); *G06F 2201/82* (2013.01); *G06F 2201/84* (2013.01)

(58) Field of Classification Search
None
See application file for complete search history.

(56) References Cited

U.S. PATENT DOCUMENTS

| 4,853,843 A | 8/1989 | Ecklund |
| 5,446,887 A | 8/1995 | Berkowitz |
| 5,524,240 A | 6/1996 | Barbara et al. |
| 5,555,404 A | 9/1996 | Torbørnsen et al. |
| 5,568,638 A | 10/1996 | Hayashi et al. |
| 5,701,467 A | 11/1997 | Freeston |

(Continued)

FOREIGN PATENT DOCUMENTS

| EA | 002931 B1 | 10/2001 |
| EP | 1403782 A2 | 3/2004 |

(Continued)

OTHER PUBLICATIONS

U.S. Appl. No. 15/296,439, filed Oct. 18, 2016, Ottavio.

(Continued)

*Primary Examiner* — Ashish Thomas
*Assistant Examiner* — Dustin D Eyers
(74) *Attorney, Agent, or Firm* — Smith Baluch LLP

(57) ABSTRACT

Techniques are disclosed for backup and restore in a distributed database utilizing consistent database snapshots. In particular, a distributed database system configured in accordance with an embodiment of the present disclosure includes a plurality of interconnected database nodes that collectively define a database having no single point of failure and that can be "viewed" by a SQL client as a single, logical database. In the course of executing such transactions, the distributed database system enables clients to declare snapshots that, when the transaction is committed, cause the distributed database system to logically freeze a consistent and complete copy of the state of the database at the point in time the transaction completed. Such snapshots enable clients to execute so-called "point-in-time" queries against those past states to return a result set that is essentially a reconstructed version of the database "as of" a particular point in time.

12 Claims, 14 Drawing Sheets

(56) References Cited

U.S. PATENT DOCUMENTS

| | | | |
|---|---|---|---|
| 5,764,877 A | 6/1998 | Lomet et al. | |
| 5,960,194 A | 9/1999 | Choy et al. | |
| 6,216,151 B1 | 4/2001 | Antoun | |
| 6,226,650 B1 | 5/2001 | Mahajan et al. | |
| 6,275,863 B1 | 8/2001 | Leff et al. | |
| 6,334,125 B1 | 11/2001 | Johnson et al. | |
| 6,401,096 B1 | 6/2002 | Zellweger | |
| 6,424,967 B1 | 7/2002 | Johnson et al. | |
| 6,480,857 B1 | 11/2002 | Chandler | |
| 6,499,036 B1 | 12/2002 | Gurevich | |
| 6,523,036 B1 | 2/2003 | Hickman et al. | |
| 6,748,394 B2 | 6/2004 | Shah et al. | |
| 6,792,432 B1 | 9/2004 | Kodavalla et al. | |
| 6,862,589 B2 | 3/2005 | Grant | |
| 7,026,043 B2 | 4/2006 | Bleizeffer et al. | |
| 7,080,083 B2 | 7/2006 | Kim et al. | |
| 7,096,216 B2 | 8/2006 | Anonsen | |
| 7,219,102 B2 | 5/2007 | Zhou et al. | |
| 7,233,960 B1 | 6/2007 | Boris et al. | |
| 7,293,039 B1 | 11/2007 | Deshmukh et al. | |
| 7,353,227 B2 | 4/2008 | Wu | |
| 7,395,352 B1 | 7/2008 | Lam et al. | |
| 7,401,094 B1 | 7/2008 | Kesler | |
| 7,403,948 B2 | 7/2008 | Ghoneimy et al. | |
| 7,562,102 B1 | 7/2009 | Sumner et al. | |
| 7,853,624 B2 | 12/2010 | Friedlander et al. | |
| 7,890,508 B2 | 2/2011 | Gerber et al. | |
| 8,108,343 B2 | 1/2012 | Wang et al. | |
| 8,224,860 B2 | 7/2012 | Starkey | |
| 8,266,122 B1 | 9/2012 | Newcombe et al. | |
| 8,504,523 B2 | 8/2013 | Starkey | |
| 8,583,598 B2 | 11/2013 | Shaull et al. | |
| 8,756,237 B2 | 6/2014 | Stillerman et al. | |
| 9,501,363 B1 | 11/2016 | Ottavio | |
| 9,697,253 B2* | 7/2017 | Chidambaran | G06F 16/24552 |
| 9,734,021 B1* | 8/2017 | Sanocki | G06F 11/1469 |
| 10,037,348 B2 | 7/2018 | Proctor et al. | |
| 10,067,969 B2 | 9/2018 | Rice et al. | |
| 10,180,954 B2 | 1/2019 | Palmer | |
| 2002/0112054 A1 | 8/2002 | Hatanaka | |
| 2002/0152261 A1 | 10/2002 | Arkin et al. | |
| 2002/0152262 A1 | 10/2002 | Arkin et al. | |
| 2002/0178162 A1* | 11/2002 | Ulrich | G06F 17/30867 |
| 2003/0051021 A1 | 3/2003 | Hirschfeld et al. | |
| 2003/0149709 A1 | 8/2003 | Banks | |
| 2003/0204486 A1 | 10/2003 | Berks et al. | |
| 2003/0220935 A1 | 11/2003 | Vivian et al. | |
| 2004/0153459 A1 | 8/2004 | Whitten | |
| 2004/0263644 A1 | 12/2004 | Ebi | |
| 2005/0013208 A1 | 1/2005 | Hirabayashi et al. | |
| 2005/0086384 A1 | 4/2005 | Ernst | |
| 2005/0198062 A1 | 9/2005 | Shapiro | |
| 2005/0216502 A1 | 9/2005 | Kaura et al. | |
| 2006/0010130 A1 | 1/2006 | Leff et al. | |
| 2006/0235823 A1 | 10/2006 | Chong et al. | |
| 2007/0067349 A1 | 3/2007 | Jhaveri et al. | |
| 2008/0086470 A1 | 4/2008 | Graefe | |
| 2008/0228795 A1 | 9/2008 | Lomet | |
| 2008/0320038 A1 | 12/2008 | Liege | |
| 2009/0113431 A1 | 4/2009 | Whyte | |
| 2010/0094802 A1 | 4/2010 | Luotojarvi et al. | |
| 2010/0115246 A1 | 5/2010 | Seshadri et al. | |
| 2010/0153349 A1 | 6/2010 | Schroth | |
| 2010/0191884 A1 | 7/2010 | Holenstein et al. | |
| 2010/0235606 A1 | 9/2010 | Oreland et al. | |
| 2010/0241614 A1 | 9/2010 | Shaull et al. | |
| 2010/0297565 A1 | 11/2010 | Waters et al. | |
| 2011/0087874 A1 | 4/2011 | Timashev et al. | |
| 2011/0225167 A1 | 9/2011 | Bhattacharjee et al. | |
| 2011/0231447 A1 | 9/2011 | Starkey | |
| 2012/0102022 A1 | 4/2012 | Miranker et al. | |
| 2012/0254175 A1 | 4/2012 | Horowitz et al. | |
| 2012/0136904 A1 | 5/2012 | Venkata Naga Ravi | |
| 2013/0060922 A1 | 3/2013 | Koponen et al. | |
| 2013/0110766 A1 | 5/2013 | Promhouse et al. | |
| 2013/0110774 A1 | 5/2013 | Shah et al. | |
| 2013/0110781 A1 | 5/2013 | Golab et al. | |
| 2013/0159265 A1 | 6/2013 | Peh et al. | |
| 2013/0159366 A1 | 6/2013 | Lyle et al. | |
| 2013/0179482 A1 | 7/2013 | Becker et al. | |
| 2013/0232378 A1 | 9/2013 | Resch et al. | |
| 2013/0262403 A1* | 10/2013 | Milousheff | G06F 17/30371 707/691 |
| 2013/0297565 A1 | 11/2013 | Starkey | |
| 2013/0311426 A1 | 11/2013 | Erdogan et al. | |
| 2014/0108414 A1 | 4/2014 | Stillerman et al. | |
| 2014/0149353 A1* | 5/2014 | Lee | G06F 17/30356 707/639 |
| 2014/0172914 A1 | 6/2014 | Elnikety et al. | |
| 2014/0279881 A1 | 9/2014 | Tan et al. | |
| 2014/0279929 A1 | 9/2014 | Gupta et al. | |
| 2014/0297676 A1 | 10/2014 | Bhatia et al. | |
| 2014/0304306 A1 | 10/2014 | Proctor et al. | |
| 2014/0310260 A1 | 10/2014 | Wu et al. | |
| 2015/0019496 A1 | 1/2015 | Stewart et al. | |
| 2015/0019739 A1 | 1/2015 | Attaluri et al. | |
| 2015/0032695 A1* | 1/2015 | Tran | G06F 17/00 707/625 |
| 2015/0066858 A1* | 3/2015 | Sabdar | G06F 17/30088 707/639 |
| 2015/0128063 A1* | 5/2015 | Jones | G06F 16/00 715/741 |
| 2015/0135255 A1 | 5/2015 | Theimer et al. | |
| 2015/0199415 A1* | 7/2015 | Bourbonnais | G06F 17/30578 707/615 |
| 2015/0370505 A1* | 12/2015 | Shuma | G06F 3/0647 711/165 |
| 2016/0134490 A1* | 5/2016 | Balasubramanyan | H04L 41/5032 707/638 |
| 2017/0039099 A1 | 2/2017 | Ottavio | |
| 2018/0357264 A1 | 12/2018 | Rice et al. | |

FOREIGN PATENT DOCUMENTS

| | | |
|---|---|---|
| JP | 2003-256256 | 9/2003 |
| JP | 2006-048507 | 2/2006 |
| JP | 2007-058275 | 3/2007 |
| RU | 2315349 C1 | 1/2008 |
| RU | 2008106904 A | 8/2009 |

OTHER PUBLICATIONS

Amazon CloudWatch Developer Guide API, Create Alarms That or Terminate an Instance, Jan. 2013, downloaded Nov. 16, 2016 from archive.org., pp. 1-11.

Amazon RDS FAQs, Oct. 4, 2012, downloaded Nov. 16, 2016 from archive.org., 39 pp.

Decision to Grant dated Nov. 14, 2016 from Belarus Patent Application No. a20121441 with English Translation, 15 pp.

Final Office Action dated Nov. 3, 2016 from U.S. Appl. No. 14/215,401, 36 pp.

Final Office Action dated Dec. 13, 2016 from U.S. Appl. No. 14/247,364, 31 pp.

Garding, P. "Alerting on Database Mirorring Events," Apr. 7, 2006, downloaded Dec. 6, 2016 from technet.microsoft.com, 24 pp.

International Search Report and Written Opinion dated Oct. 28, 2016 from PCT/US16/34651, 16 pp.

Non-Final Office Action dated Feb. 1, 2016 from U.S. Appl. No. 14/215,461, 19 pp.

Veerman, G. et al., "Database Load Balancing, MySQL 5.5 vs PostgreSQL 9.1," Universiteit van Amsterdam, System & Network Engineering, Apr. 2, 2012, 51 pp.

Iqbal, A. M. et al., "Performance Tradeoffs in Static and Dynamic Load Balancing Strategies," Instittute for Computer Applications in Science and Engineering, 1986, pp. 1-23.

Non-Final Office Action dated Apr. 12, 2017 from U.S. Appl. No. 14/247,364, 12 pp.

Non-Final Office Action dated May 31, 2017 from U.S. Appl. No. 14/215,401, 27 pp.

(56) References Cited

OTHER PUBLICATIONS

Non-Final Office Action dated Jun. 1, 2017 from U.S. Appl. No. 14/215,461, 21 pp.
Non-Final Office Action dated Jun. 2, 2017 from U.S. Appl. No. 14/744,546, 25 pp.
Roy, N. et al., "Efficient Autoscaling in the Cloud using Predictive Models for Workload Forecasting," *IEEE* 4th International Conference on Cloud Computing, 2011, pp. 500-507.
U.S. Appl. No. 14/215,372, filed Mar. 17, 2014, Ottavio.
U.S. Appl. No. 14/215,401, filed Mar. 17, 2014, Palmer.
U.S. Appl. No. 14/215,461, filed Mar. 17, 2014, Palmer.
U.S. Appl. No. 14/616,713, filed Feb. 8, 2015, Levin.
U.S. Appl. No. 14/725,916, filed May 29, 2015, Rice.
U.S. Appl. No. 14/726,200, filed May 29, 2015, Palmer.
U.S. Appl. No. 14/744,546, filed Jun. 19, 2015, Massari.
"Album Closing Policy," Background, retrieved from the Internet at URL:http://tools/wiki/display/ENG/Album+Closing+Policy (Jan. 29, 2015), 4 pp.
Bergsten et al., "Overview of Parallel Architectures for Databases," *The Computer Journal* vol. 36, No. 8, pp. 734-740 (1993).
Dan et al., "Performance Comparisons of Buffer Coherency Policies," Proceedings of the International Conference on Distributed Computer Systems, *IEEE Comp. Soc. Press* vol. 11, pp. 208-217 (1991).
International Preliminary Report on Patentability dated Oct. 13, 2015 from PCT/US2014/033270, 4 pp.
International Search Report and Written Opinion dated Aug. 21, 2014 from PCT/US2014/033270, 5 pp.
International Search Report dated Sep. 26, 2012 from PCT/US2011/029056, 4 pp.
Leverenz et al., "Oracle8i Concepts, Partitioned Tables and Indexes," Chapter 11, pp. 11-2-11/66 (1999).
Non-Final Office Action dated Jan. 21, 2016 from U.S. Appl. No. 14/215,401, 19 pp.
Non-Final Office Action dated Feb. 1, 2016 from U.S. Appl. No. 14/251,461, 19 pp.
Non-Final Office Action dated Feb. 6, 2014 from U.S. Appl. No. 13/933,483, 14 pp.
Non-Final Office Action dated May 19, 2016 from U.S. Appl. No. 14/247,364, 24 pp.
Non-Final Office Action dated Oct. 10, 2012 from U.S. Appl. No. 13/525,953, 8 pp.
Notice of Allowance dated Feb. 29, 2012 from U.S. Appl. No. 13/051,750, 8 pp.
Notice of Allowance dated Apr. 1, 2013 from U.S. Appl. No. 13/525,953, 10 pp.
Notice of Allowance dated May 14, 2012 from U.S. Appl. No. 13/051,750, 8 pp.
Rahimi, S. K. et al., "Distributed Database Management Systems: A Practical Approach," IEEE Computer Society, John Wiley & Sons, Inc. Publications (2010), 765 pp.
"SnapShot Albums," Transaction Ordering, retrieved from the Internet at URL:http://tools/wiki/display/ENG/Snapshot+Albums (Aug. 12, 2014), 4 pp.
"Table Partitioning and Storage Groups (TPSG)," Architect's Overview, NuoDB Technical Design Document, Version 2.0 (2014), 12 pp.
Yousif, M. "Shared-Storage Clusters," *Cluster Computing*, Baltzer Science Publishers, Bussum, NL, vol. 2, No. 4, pp. 249-257 (1999).
International Search Report and Written Opinion dated Jul. 15, 2016 from PCT/US2016/27658, 37 pp.
International Search Report and Written Opinion dated Sep. 8, 2016 from PCT/US16/37977, 11 pp.
International Search Report and Written Opinion dated Sep. 9, 2016 from PCT/US16/34646, 12 pp.
Final Office Action dated Sep. 9, 2016 from U.S. Appl. No. 14/215,461, 26 pp.
Non-Final Office Action dated Sep. 23, 2016 from U.S. Appl. No. 14/616,713, 8 pp.

Notice of Allowance dated Jul. 27, 2016 from U.S. Appl. No. 14/215,372, 12 pp.
Shaull, R. et al., "A Modular and Efficient Past State System for Berkeley DB", Proceedings of USENIX ATC'14: 2014 USENIX Annual Technical Conference, Jun. 19-20, 2014, 13 pages.
"No Knobs Aministration", retrieved from the Internet at URL: http://www.nuodb.com/explore/newsql-cloud-database-product/auto-administration on Feb. 4, 2015, 4 pages.
"Distributed Coordination in NuoDB", YouTube, retrieved from the Internet at URL: https://www.youtube.com/watch?feature=player_embedded&v=URoeHvflVKg on Feb. 4, 2015, 2 pages.
"Glossary—NuoDB 2.1 Documentation / NuoDB", retrieved from the Internet at URL: http://doc.nuodb.com/display/doc/Glossary on Feb. 4, 2015, 1 page.
"Hybrid Transaction and Analytical Processing with NuoDB", NuoDB Technical Whitepaper, Nov. 5, 2014, Version 1, 13 pages.
"Durable Distributed Cache Architecture", retrieved from the Internet at URL: http://www.nuodb.com/explore/newsql-cloud-database-ddc-architecture on Feb. 4, 2015, 3 pages.
"How It Works", retrieved from the Internet at URL: http://www.nuodb.com/explore/newsql-cloud-database-how-it-works?mkt_tok=3RkMMJW on Feb. 4, 2015, 4 pages.
"NuoDB at a Glance", retrieved from the Internet at URL: http://doc.nuodb.com/display/doc/NuoDB+at+a+Glance on Feb. 4, 2015, 1 page.
Shaull, Ross, "Retro: A Methodology for Retrospection Everywhere", A Dissertation Presented to the Faculty of the Graduate School of Arts and Sciences of Brandeis University, Waltham, Massachusetts, Aug. 2013, 174 pages.
Shaull, R. et al., "Skippy: a New Snapshot Indexing Method for Time Travel in the Storage Manager", SIGMOD'08, Jun. 9-12, 2008, 12 pages.
"The Architecture & Motivation for NuoDB", NuoDB Technical Whitepaper, Oct. 15, 2014, Version 1, 27 pages.
"Welcome to NuoDB Swifts Release 2.1 GA", retrieved from the Internet at URL: http://dev.nuodb.com/techblog/welcome-nuodb-swifts-release-21-ga on Feb. 4, 2015, 7 pages.
"How to Eliminate MySQL Performance Issues", NuoDB Technical Whitepaper, Sep. 10, 2014, Version 1, 11 pages.
"What Is a Distributed Database? And Why Do You Need One", NuoDB Technical Whitepaper, Jan. 23, 2014, Version 1, 9 pages.
First Examination Report issued by the Canadian Intellectual Property Office for Application No. 2,793,429, dated Feb. 14, 2017, 3 pages.
Advisory Action issued by the United States Patent and Trademark Office for U.S. Appl. No. 14/215,461, dated Jan. 10, 2017, 9 pages.
Final Office Action dated Feb. 9, 2018 from U.S. Appl. No. 14/744,546, 22 pages.
Connectivity Testing with Ping, Telnet, Trace Route and NSlookup (hereafter help.webcontrolcenter), Article ID:1757, Created: Jun. 17, 2013 at 10:45 a.m., https://help.webcontrolcenter.com/kb/a1757/connectivity-testing-with-ping-telnet-trace-route-and-nslookup.aspx, 6 pages.
Final Office Action dated Nov. 7, 2017 from U.S. Appl. No. 14/247,364, 13 pages.
Final Office Action dated Nov. 24, 2017 from U.S. Appl. No. 14/215,401, 33 pages.
Hull, Autoscaling MySQL on Amazon EC2, Apr. 9, 2012, 7 pages.
Non-Final Office Action dated Sep. 11, 2017 from U.S. Appl. No. 14/725,916, 17 pages.
Non-Final Office Action dated Sep. 19, 2017 from U.S. Appl. No. 14/726,200, 37 pages.
Oracle Database Concepts 10g Release 2 (10.2), Oct. 2005, 14 pages.
Searchcloudapplications.techtarget.com, Autoscaling Definition, Aug. 2012, 1 page.
Final Office Action dated Apr. 12, 2018 for U.S. Appl. No. 14/726,200, 6 pages.
Notice of Allowance dated May 3, 2018 for U.S. Appl. No. 14/725,916, 13 pages.
Extended European Search Report for European Patent Application No. 16780794.0 dated Sep. 19, 2018. 8 pages.

(56) References Cited

OTHER PUBLICATIONS

Extended European Search Report in European Patent Application No. 16804117.6 dated Nov. 2, 2018, 11 pages.
Extended European Search Report in European Patent Application No. 16804119.2 dated Dec. 4, 2018, 8 pages.
Extended European Search Report in European Patent Application No. 16812485.7 dated Dec. 11, 2018, 9 pages.
Özsu et al., Principles of distributed database systems. Springer Science & Business Media, Chapter 13—Data Replication, 2011. 41 pages.
Shaull et al., "Skippy: a new snapshot indexing method for time travel in the storage manager." Proceedings of the 2008 ACM SIGMOD international conference on Management of data. ACM, 2008. 12 pages.
Shaull et al., "Skippy: Enabling long-lived snapshots of the long-lived past." 2008 IEEE 24th International Conference on Data Engineering. IEEE, 2008. 3 pages.
Shrira et al., "Thresher: An Efficient Storage Manager for Copy-on-write Snapshots." USENIX Annual Technical Conference, General Track. 2006. 14 pages.
Shrira et al., "Time travel in the virtualized past: Cheap fares and first class seats." Haifa Systems and Storage Conference, SYSTOR. 2007. 6 pages.
Terry et al., "Managing update conflicts in Bayou, a weakly connected replicated storage system." ACM SIGOPS Operating Systems Review. vol. 29. No. 5. ACM, 1995. 12 pages.
European Office Action in European Patent Application No. 16780794.0 dated Feb. 14, 2020, 6 pages.

\* cited by examiner

201

Storage Manager

- Language-Neutral Peer Communication
  216
- Atom Cache
  210
- Transaction Manager
  220
- Journal
  222
- Storage Interface
  224

Snapshot Storage Manager

- Language-Neutral Peer Communication
  216
- Atom Cache
  210
- Transaction Manager
  220
- Journal
  222
- Snapshot Manager
  226
- Snapshot Optimization & Aging Policies
  228
- Storage Interface
  224

FIG. 2c

BACKUP AND RESTORE IN A DISTRIBUTED DATABASE UTILIZING CONSISTENT DATABASE SNAPSHOTS

FIELD OF DISCLOSURE

The present disclosure relates generally to database systems, and more particularly to backup and restore operations within database systems.

BACKGROUND

Database Administrators who employ best-practices regularly backup databases for the purpose of compliance, data safety, data reconstruction, and analysis purposes. Database Administrators generally establish which backup schemes to utilize based on the frequency of the backup procedures, disk space and server workloads. For example, so-called "full-backups" are complete images of a database that can require large amounts of disk space and can also take long periods of time to complete. Because full-backups have these disadvantages, database Administrators generally elect to perform this type of backup procedure on a schedule that staggers or otherwise separates each procedure by some appreciable amount of time, often measured in days or weeks. In practice, the periods of time between full-backup procedures can include performing a number of incremental or differential backups on a regular schedule to ensure data integrity for backup and restore purposes. In any such cases, before data is copied to a backup location, that data can be selected, extracted and manipulated to optimize a backup process. Some such optimizations include parameters for dealing with open files and live data sources, as well as data compression, encryption and de-duplication.

BRIEF DESCRIPTION OF THE DRAWINGS

FIG. 2b depicts the architecture of an example storage manager (SM) within the distributed database system of FIG. 1, in accordance with an embodiment of the present disclosure.

FIG. 2c depicts the architecture of an example snapshot storage manager (SSM) within the distributed database system of FIG. 1, in accordance with an embodiment of the present disclosure.

Figure 1:
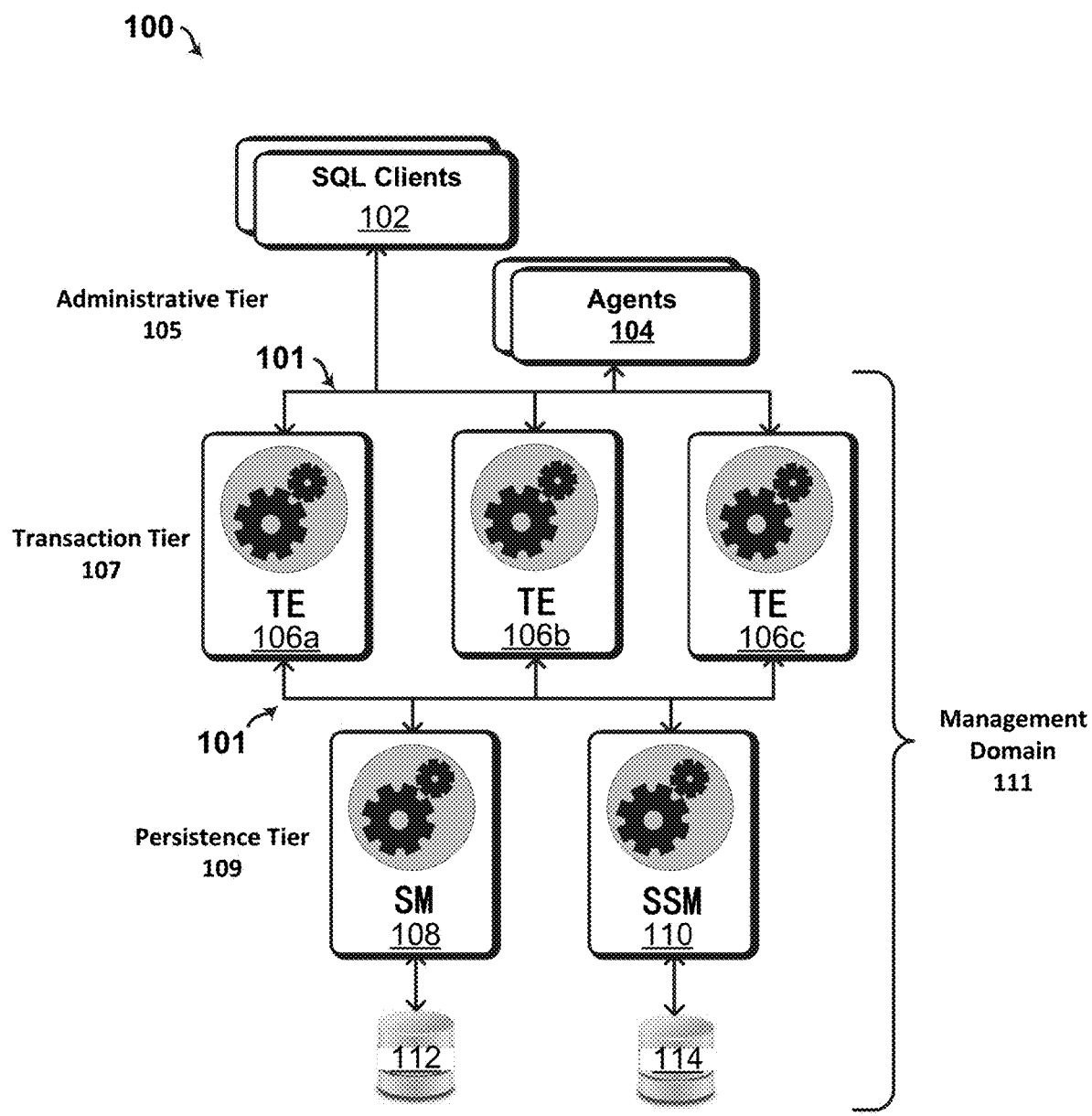
FIG. 1 depicts an example distributed database system comprising interconnected nodes configured to capture and retain consistent database snapshots in durable storage, in accordance with an embodiment of the present disclosure.

These and other features of the present embodiments will be understood better by reading the following detailed description, taken together with the figures herein described. The accompanying drawings are not intended to be drawn to scale. In the drawings, each identical or nearly identical component that is illustrated in various figures is represented by a like numeral. For purposes of clarity, not every component may be labeled in every drawing.

DETAILED DESCRIPTION

Techniques are disclosed for backup and restore in a distributed database system utilizing consistent database snapshots. A distributed database system configured in accordance with an example embodiment includes a plurality of interconnected database nodes, also referred to as nodes, that collectively form a database that has no single point of failure and that can be accessed as a single, logical database using structured query language (SQL) queries. Such a distributed database system is ACID-compliant, in that it exhibits the desirable properties of Atomicity, Consistency, Isolation, and Durability (ACID) and thus enables clients to execute concurrent update transactions to the database in a consistent manner. Examples of such transactions include, for instance, write, insert, and delete operations. In the course of executing such transactions, the distributed database system as configured in accordance with the present disclosure enables clients to declare "snapshots" that cause the distributed database system to logically freeze a consistent and complete copy of the database state at a point in time the transaction completed. Such snapshots enable clients to later execute "point-in-time" queries against those past states to return a result set that can be understood as a reconstructed version of the database "as of" a particular point in time. Certain embodiments disclosed herein thus provide a high-resolution archival and restore functionality that allows snapshots to fully capture and record changes to a distributed database over time, without significantly impacting performance of ongoing database operations such as insert, read, and update operations.

A number of advantages are associated with certain aspects of the disclosed embodiments. For example, the techniques for declaring snapshots disclosed herein enable backups to be performed on a regular or automatic schedule, without adversely impacting ongoing database operations. Such functionality also enables database Administrators to resolve problems of the recent past, including "fumble-finger" mistakes and other database-corrupting events, which can be often difficult or otherwise impossible to reverse using SQL queries alone. In addition, reconstructing data from an erroneously-dropped table can be difficult and tedious without use of the snapshots and point-in-time queries disclosed herein.

In some embodiments, a distributed database system is configured to provide client-level access to snapshots, thereby enabling clients to resurrect lost data or to otherwise undo an erroneous database operation. In such embodiments, a client can execute a query that returns a reconstructed result set from a particular point-in-time, and restores or otherwise "rolls back" the database to a former state using that reconstructed data. Such queries can be performed on a database that is also concurrently performing normal write and read operations. Further, in some embodiments, database Administrators can select a particular snapshot and execute backup routines that save a consistent copy of the database to durable storage based on the selected snapshot. Thus, in the event of a catastrophic failure, the distributed database system can be restored from such an offline backup and brought back into normal operation.

Architecture and Operation

FIG. 1 illustrates an example distributed database system 100 comprising interconnected nodes configured to capture and retain consistent database snapshots in durable storage, in accordance with an embodiment of the present disclosure. As shown in the example embodiment, the architecture of the distributed database system 100 includes a number of database nodes assigned to three logical tiers: an administrative tier 105, a transaction tier 107, and a persistence tier 109. The nodes comprising the distributed database system 100 are peer nodes that can communicate directly and securely with each other to coordinate ongoing database operations. So, as long as at least one database node is operational within each of the transaction tier 107 and the persistence tier 109, SQL clients 102 can connect and perform transactions against databases hosted within the distributed database system 100.

In more detail, the distributed database system 100 is an elastically-scalable database system comprising an arbitrary number of database nodes (e.g., nodes 106a-106c, 108 and 110) executed on an arbitrary number of host computers (not shown). For example, database nodes can be added and removed at any point on-the-fly, with the distributed database system 100 using newly added nodes to "scale out" or otherwise increase database performance and transactional throughput. As will be appreciated in light of this disclosure, the distributed database system 100 departs from conventional database approaches that tightly couple on-disk representations of data (e.g., pages) with in-memory structures. Instead, certain embodiments disclosed herein advantageously provide a memory-centric database wherein each peer node implements a memory cache in volatile memory (e.g., random-access memory) that can be utilized to keep active portions of the database cached for efficient updates during ongoing transactions. In addition, database nodes of the persistence tier 109 can implement storage interfaces that can commit those in-memory updates to physical storage devices to make those changes durable (e.g., such that they survive reboots, power loss, application crashes). Such a combination of distributed memory caches and durable storage interfaces is generally referred to herein as a durable distributed cache (DDC).

In an embodiment, database nodes can request portions of the database residing in a peer node's cache memory, if available, to avoid the expense of disk reads to retrieve portions of the database from durable storage. Examples of durable storage that can be used in this regard include a hard drive, a network attached storage device (NAS), a redundant array of independent disks (RAID), and any other suitable storage device. As will be appreciated in light of this disclosure, the distributed database system 100 enables the SQL clients 102 to view what appears to be a single, logical database with no single point of failure, and perform transactions that advantageously keep in-use portions of the database in cache memory (e.g., volatile RAM) while providing ACID properties.

The SQL clients 102 can be implemented as, for example, any application or process that is configured to construct and execute SQL queries. For instance, the SQL clients 102 can be user applications implementing various database drivers and/or adapters including, for example, java database connectivity (JDBC), open source database connectivity (ODBC), PHP data objects (PDO), or any other database driver that is configured to communicate and utilize data from a relational database. As discussed above, the SQL clients 102 can view the distributed database system 100 as a single, logical database. To this end, the SQL clients 102 address what appears to be a single database host (e.g., utilizing a single hostname or internet protocol (IP) address), without regard for how many database nodes comprise the distributed database system 100.

Within the transaction tier 107 a plurality of TE nodes 106a-106c is shown. The transaction tier 107 can comprise more or fewer TEs, depending on the application, and the number shown should not be viewed as limiting the present disclosure. As discussed further below, each TE can accept SQL client connections from the SQL clients 102 and concurrently perform transactions against the database within the distributed database system 100. In principle, the SQL clients 102 can access any of the TEs to perform database queries and transactions. However, and as discussed below, the SQL clients 102 can advantageously select those TEs that provide a low-latency connection through an agent node running as a "connection broker", as will be described in turn.

Within the persistence tier 109 a SM 108 and a SSM 110 is shown. In an embodiment, each of the SM 108 and SSM 110 include a full archive of the database within a durable storage location 112 and 114, respectively. In an embodiment, the durable storage locations 112 and 114 can be local (e.g., within the same host computer) to the SM 108 and the SSM 110. For example, the durable storage locations 112 and 114 can be implemented as a physical storage device such as a spinning hard drive, solid-state hard drive, or a raid array comprising a plurality of physical storage devices. In other cases, the durable storage locations 112 and 114 can be implemented as, for example, network locations (e.g., NAS) or other suitable remote storage devices and/or appliances, as will be apparent in light of this disclosure.

In an embodiment, each database node (TEs 106a-106c, SM 108 and SSM 110) of the distributed database system 100 can comprise a computer program product including machine-readable instructions compiled from C, C++, Java, Python or other suitable programming languages. These instructions may be stored on a non-transitory computer-readable medium, such as in a memory of a given host computer, and when executed cause a given database node instance to be instantiated and executed. As discussed below, an agent node can cause such instantiation and execution of database nodes by causing a processor to execute instructions corresponding to a given database node. One such computing system 1100 capable of instantiating and executing database nodes of the distributed database system 100 is discussed below with regard to FIG. 9.

In an embodiment, the database nodes of each of the administrative tier 105, the transaction tier 107, and the persistence tier 109 are communicatively coupled through one or more communication networks 101. In an embodiment, such communication networks 101 can be implemented as, for example, a physical or wireless communication network that enables data exchanges (e.g., packets) between two points (e.g., nodes running on a host computer) utilizing one or more data transport protocols. Some such example protocols include transmission control protocol (TCP), user datagram protocol (UDP), shared memory, pipes or any other suitable communication means that will be apparent in light of this disclosure. In some cases, the SQL clients 102 access the various database nodes of the distributed database system 100 through a wide area network (WAN) facing IP address. In addition, as each database node within the distributed database system 100 could be located virtually anywhere where there is network connectivity, encrypted point-to-point connections (e.g., virtual private network (VPN)) or other suitable secure connection types may be established between database nodes.

Management Domains

As shown, the administrative tier 105 includes agent nodes 104 that are configured to manage database configurations, and are executed on computer systems that will host database resources. Thus, and in accordance with an embodiment, the execution of an agent node is a provisioning step that both makes the host computer available to run database nodes, and makes the host computer visible to distributed database system 100. A collection of these provisioned host computers is generally referred to herein as a management domain. Each management domain is a logical boundary that defines a pool of resources available to run databases, and contains permissions for users to manage or otherwise access those database resources. For instance, and as shown in FIG. 1, the distributed database system 100 includes one such management domain 111 that encompasses the database nodes of the distributed database system 100, and the one or more respective host computers (not shown) executing those database nodes.

For a given management domain, an agent node running on each of the host computers is responsible for starting and stopping a database, monitoring those nodes and the host computer's resources, and performing other host-local tasks. In addition, each agent node enables new database nodes to be executed to, for example, increase transaction throughput and/or to increase the number of storage locations available within the distributed database system 100. This enables the distributed database system 100 to be elastic as new host computers and/or database nodes can be added in an on-demand manner to meet changing database demands. For example, database nodes can be added on-the-fly while the database is running (e.g., during ongoing database operations), and those database nodes can automatically authenticate with their peer nodes in order to perform secure point-to-point communication within the management domain 111.

In an embodiment, one or more of the agents 104 can be further configured to operate as a connection broker. The connection broker role enables a global view of all agents in a management domain, and thus all nodes, databases and events (e.g., diagnostic, error related, informational) therein. In addition, the connection broker role enables load-balancing between the SQL clients 102 and the TEs 106a-106c. For example, the SQL clients 102 can connect to a particular agent node configured as a connection broker in order to receive an identifier of a TE (e.g., an IP address, host name, alias, or logical identifier) that can service connections and execute transactions with a relatively low latency compared to other TEs. In an embodiment, load-balancing policies are configurable, and can be utilized to optimize connectivity based on factors such as, for example, resource utilization and/or locality (e.g., with a preference for those TEs geographically closest to a SQL client, or those TEs with the fastest response time).

Transaction Engine Architecture

Figure 2A:
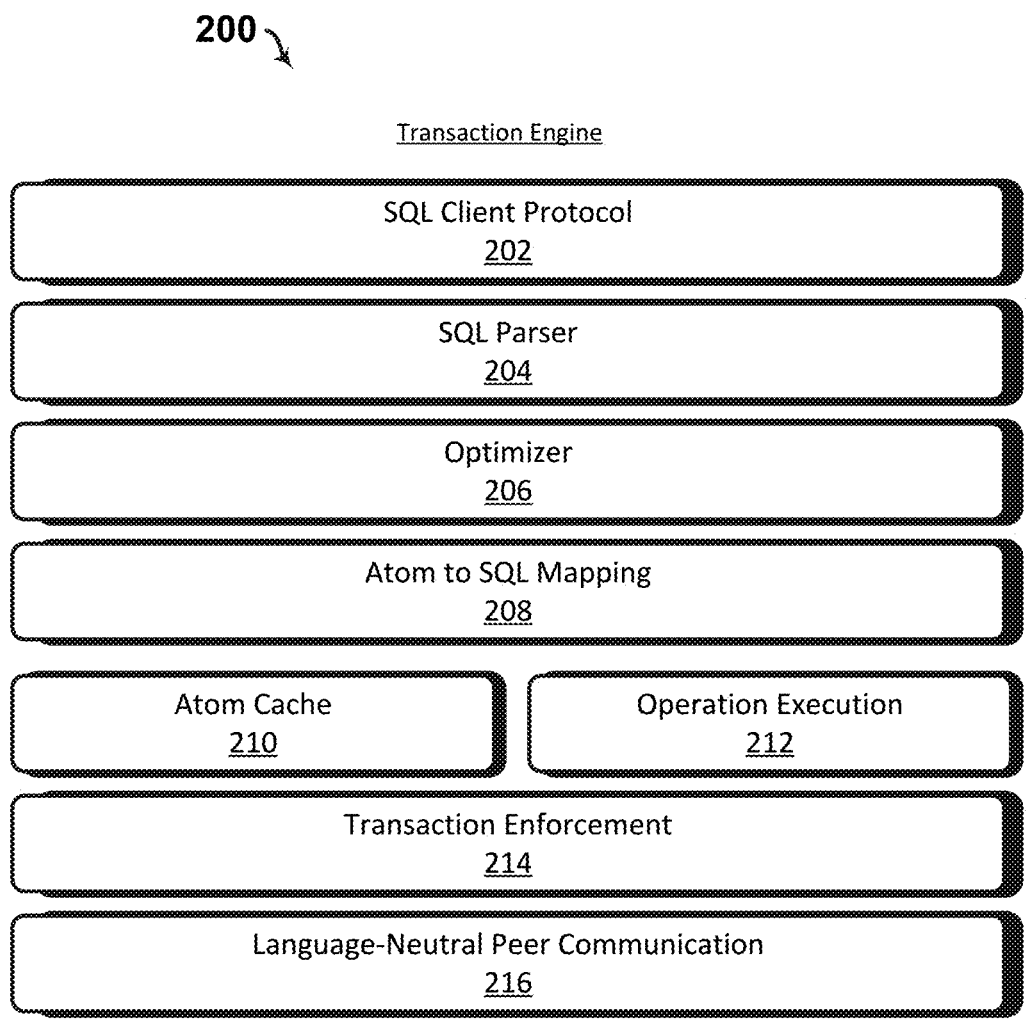
FIG. 2a depicts the architecture of an example transaction engine (TE) within the distributed database system of FIG. 1, in accordance with an embodiment of the present disclosure.

FIG. 2a depicts one example of the architecture 200 of the TEs (e.g., TEs 106a-106c) within the distributed database system 100, in accordance with an embodiment of the present disclosure. As discussed above, TEs are client-facing database nodes that accept connections from the SQL clients 102 and enable a single, logical view of a database across a plurality of database nodes within the management domain 111. Accordingly, and as shown, the TE architecture 200 includes a SQL client protocol module 202. In an embodiment, the SQL client protocol module 202 can be configured to host remote connections (e.g., through UDP/TCP) and receive packets (or data structures via shared memory/pipes) from SQL clients 102 to execute SQL transactions. The SQL parser module 204 is configured to receive the SQL transactions from the remote connections, and parses those queries to perform various functions including, for example, validating syntax and semantics validation, determining whether adequate permissions exist to execute the statements, and allocating memory and other resources dedicated to the query. In some cases, a transaction can comprise a single operation such as "SELECT," "UPDATE," "INSERT," and "DELETE," just to name a few. In other cases, each transaction can comprise a number of such operations affecting multiple objects within a database. In these cases, and as will be discussed further below, the distributed database system 100 enables a coordinated approach that ensures these transactions are consistent and do not result in errors or other corruption that can otherwise be caused by concurrent transactions updating the same portions of a database (e.g., performing writes on a same record or other database object simultaneously).

In an embodiment, an optimizer 206 can be configured to determine a preferred way of executing a given query. To this end, the optimizer 206 can utilize indexes, clusters, and table relationships to avoid expensive full-table scans and to utilize portions of the database within cache memory when possible.

As shown, the example TE architecture 200 includes an atom to SQL mapping module 208. The atom to SQL mapping module 208 can be utilized to locate atoms that correspond to portions of the database that are relevant or otherwise affected by a particular transaction being performed. As generally referred to herein, the term "atom" refers to flexible data objects or structures that contains a current version and a number of historical versions for a particular type of database object (e.g., schema, tables, rows, data, blobs, and indexes). Within TE nodes, atoms generally exist in non-persistent memory, such as in an atom cache module, and can be serialized and de-serialized, as appropriate, to facilitate communication of the same between database nodes. As will be discussed further below with regard to FIG. 2b, atom updates can be committed to durable storage by SMs and SSMs. So, atoms can be marshaled or un-marshaled by SMs and SSMs utilizing durable storage to service requests for those atoms by TEs.

In an embodiment, each TE is responsible for mapping SQL content to corresponding atoms. As generally referred to herein, SQL content comprises database objects such as, for example, tables, indexes and records that may be represented within atoms. In this embodiment, a catalog may be utilized to locate the atoms which are needed to perform a given transaction within the distributed database system 100. Likewise, the optimizer 206 can also utilize such mapping to determine atoms that may be immediately available in the atom cache 210.

Although TEs are described herein as comprising SQL-specific modules 202-208, such modules are essentially plug-and-play translation layers that can be replaced with other non-SQL modules having a different dialect or programming language. As will be appreciated in light of this disclosure, ACID properties are enforced at the atom-level, which enables the distributed database system to execute other non-SQL type concurrent data manipulations while still providing ACID properties.

Continuing with FIG. 2a, the TE architecture 200 includes an atom cache 210. As discussed above with regard to FIG. 1, the atom cache 210 is part of the DDC implemented within the distributed database system 100. To this end, and in accordance with an embodiment of the present disclosure, the atom cache 210 hosts a private memory space in RAM accessible by a given TE. The size of the atom cache can be user-configurable, or sized to utilize all available memory space on a host computer, depending upon a desired configuration. When a TE first executes, the atom cache 210 is populated with one or more atoms representing a master catalog. In an embodiment, the TE utilizes this master catalog to satisfy executed transactions, and in particular, to identify and request the atoms within the atom cache 210 of other peer nodes (including peer TEs, SMs and SSMs). If an atom is unavailable in any atom cache, a request can be sent to an SM or SSM within the distributed database system 100 to retrieve the atom from durable storage and thus make the requested atom available within the atom cache of the SM or SSM. So, it should be appreciated in light of this disclosure that the atom cache 210 is an on-demand cache, wherein atoms can be copied from one atom cache to another, as needed. It should be further appreciated that the on-demand nature of the atom cache 210 enables various performance enhancements as a given TE can quickly and efficiently be brought on-line without the necessity of retrieving a large number of atoms. Moreover, a given TE can remove atoms from the atom cache 210 as needed, and thus reduce participation in the replication procedures discussed below with regard to FIGS. 7A-7C.

Still continuing with FIG. 2a, the TE architecture 200 includes an operation execution module 212. The operation execution module 212 can be utilized to perform in-memory updates to atoms (e.g., data manipulations) within the atom cache 210 based on a given transaction. Once the operation execution module 212 has performed various in-memory updates to atoms, a transaction enforcement module 214 ensures that changes occurring within the context of a given transaction are performed in a manner that provides ACID properties. As discussed above, concurrently-executed transactions can potentially alter the same portions of a database during execution. By way of illustration, consider the sequence of events that occur when money is moved between bank accounts represented by tables and data in a database. During one such example transaction, a subtraction operation decrements money from one record in the database and then adds the amount decremented to another record. This example transaction is then finalized by a commit operation that makes those record changes "durable" or otherwise permanent (e.g., in hard drive or other non-volatile storage area). Now consider if two such transactions are concurrently performed that manipulate data in same portions of the database. Without careful consideration of this circumstance, each transaction could fail before fully completing, or otherwise cause an inconsistency within the database (e.g., money subtracted from one account but not credited to another, incorrect amount debited or added to an account, and other unexpected and undesirable outcomes). This is so because one transaction could alter or otherwise manipulate data causing the other transaction to "see" an invalid or intermediate state of that data. To avoid such isolation and consistency violations in the face of concurrent transactions, and in accordance with an embodiment of the present disclosure, the distributed database system 100 applies ACID properties. These properties can be applied not at a table or row level, but at an atom-level. To this end, concurrency is addressed in a generic way without the distributed database system 100 having specific knowledge that atoms contain SQL structures. Application of the ACID properties within the context of the distributed database system 100 will now be discussed in turn.

Atomicity refers to transactions being completed in a so-called "all or nothing" manner such that if a transaction fails, a database state is left unchanged. Consequently, transactions are indivisible ("atomic") and fully complete, or fully fail, but never perform partially. This is important in the context of the distributed database 100, where a transaction not only affects atoms within the atom cache of a given TE processing the transaction, but all database nodes having a copy of those atoms as well. As will be discussed below, changes to atoms can be communicated in an asynchronous manner to each database process, with those nodes finalizing updates to their respective atom copies only after the transaction enforcement module 214 of the TE processing the transaction broadcasts a commit message to all interested database nodes. This also provides consistency, since only valid data is committed to the database when atom updates are finally committed. In addition, isolation is achieved as concurrently executed transactions do not "see" versions of data that are incomplete or otherwise in an intermediate state of change. As discussed further below, durability is provided by SM and SSM database nodes, which also receive atom updates during transaction processing by TEs, and finalize those updates to durable storage (e.g., by serializing atoms to a physical storage location) before acknowledging a commit. In accordance with an embodiment, an SM or SSM may journal changes efficiently before acknowledging a commit, and then serialize atoms to durable storage periodically in batches (e.g., utilizing lazy-write).

To comply with ACID properties, and to mitigate undesirable delays due to locks during write operations, the transaction enforcement module 214 can be configured to utilize multi-version concurrency control (MVCC). In an embodiment, the transaction enforcement module 214 implements MVCC by allowing several versions of data to exist in a given database simultaneously. Therefore, an atom cache (and durable storage) can hold multiple versions of database data and metadata used to service ongoing queries to which different versions of data are simultaneously visible. In particular, and with reference to the example atom structure shown in FIG. 4, atoms are objects that can contain a canonical (current) version and a predefined number of pending or otherwise historical versions that may be used by current transactions. To this end, atom versioning is accomplished with respect to versions of data within atoms, and not atoms themselves. Note, a version is considered pending until a corresponding transaction successfully commits. So, the structure and function of atoms enable separate versions to be held in-cache so that no changes occur in-place (e.g., in durable storage); rather, updates can be communicated in a so-called "optimistic" manner as a rollback can be performed by dropping a pending update from an atom cache. In an embodiment, the updates to all interested database nodes that have a copy of the same atom in their respective atom cache (or durable storage) can be communicated asynchronously (e.g., via a communication network), and thus, allowing a transaction to proceed with the assumption that a transaction will commit successfully.

Continuing with FIG. 2a, the example TE architecture 200 includes a language-neutral peer communication module 216. In an embodiment, the language-neutral peer communication module 216 is configured to send and receive low-level messages amongst peer nodes within the distributed database system 100. These messages are responsible for, among other things, requesting atoms, broadcasting replication messages, committing transactions, and other database-related messages. As generally referred to herein, language-neutral denotes a generic textual or binary-based protocol that can be utilized between database nodes that is not necessarily SQL. To this end, while the SQL client protocol module 202 is configured to receive SQL-based messages via communication network 101, the protocol utilized between agents, TEs, SM, and SSMs using the communication network 101 can be a different protocol and format, as will be apparent in light of this disclosure.

Storage Manager Architecture

FIG. 2b depicts one example of the architecture 201 of the SMs (e.g., SM 108) within the distributed database system 100, in accordance with an embodiment of the present disclosure. Each SM is configured to address its own full archive of a database within the distributed database system 100. As discussed above, each database within the distributed database system 100 persists essentially as a plurality of atom objects (e.g., versus pages or other memory-aligned structures). Thus, to adhere to ACID properties, SMs can store atom updates to physical storage once transactions are committed. ACID calls for durability of data such that once a transaction has been committed, that data permanently persists in storage until otherwise affirmatively removed. To this end, the SMs receive atom updates from TE nodes (e.g., TEs 106a-106c) performing transactions, and commit those transactions in a manner that utilizes, for example, MVCC as discussed above with regard to FIG. 2a. So, as will be apparent in light of this disclosure, SMs function similarly to TEs as they can perform in-memory updates of atoms within their respective local atom caches; however, SMs eventually write such modified atoms to durable storage. In addition, each SM can be configured to receive and service atom request messages from peer database nodes within the distributed database system 100.

In some cases, atom requests can be serviced by returning requested atoms from the atom cache of an SM. However, and in accordance with an embodiment, a requested atom may not be available in a given SM's atom cache. Such circumstances are generally referred to herein as "misses" as there is a slight performance penalty because durable storage must be accessed by an SM to retrieve those atoms, load them into the local atom cache, and provide those atoms to the database node requesting those atoms. For example, a miss can be experienced by a TE, SM or an SSM when it attempts to access an atom in its respective cache and that atom is not present. In this example, a TE responds to a miss by requesting that missing atom from another peer node (e.g., TE, SM, or an SSM). In contrast, an SM responds to a miss by requesting that missing atom from another peer node (e.g., a TE, SM, or an SSM), or by loading that missing atom from durable storage if no peer nodes have the atom cached in their respective atom cache. To this end, a node incurs some performance penalty for a miss. Note that in some cases there may be two misses. For instance, a TE may miss and request an atom from an SM, and in turn, the SM may miss (e.g., the requested atom is not in the SM's atom cache) and load the requested atom from disk.

As shown, the example SM architecture 201 includes modules that are similar to those described above with regard to the example TE architecture 200 of FIG. 2a (e.g., the language-neutral peer communication module 216, and the atom cache 210). It should be appreciated that these shared modules are adaptable to the needs and requirements of the particular logical tier to which a node belongs, and thus, can be utilized in a generic or so-called "plug-and-play" fashion by both transactional (e.g., TEs) and persistence-related database nodes (e.g., SMs and SSMs). However, and in accordance with the shown embodiment, the example SM architecture also includes additional persistence-centric modules including a transaction manager module 220, a journal module 222, and a storage interface 224. Each of these persistence-centric modules will now be discussed in turn.

As discussed above, a SM node is responsible for addressing a full archive of one or more databases within the distributed database system 100. To this end, the SM receives atom updates during transactions occurring on one or more TEs (e.g., TEs 106a-106c) and is tasked with ensuring that the updates in a commit are made durable prior to acknowledging that commit to a TE, assuming that transaction successfully completes. Within the context of the example SM architecture 201, this is enabled by the transaction manager module 220 enforcing a partial order on committed transactions in which they are made durable in the order they are committed at each TE node. As all database-related data is represented by atoms, so too are transactions within the distributed database system 100, in accordance with an embodiment. To this end, the transaction manager module 220 can store transaction atoms within durable storage. As will be appreciated, this enables SMs to logically store multiple versions of data-related atoms (e.g., record atoms, data atoms, blob atoms) and perform so-called "visibility" routines to determine the current version of data that is visible within a particular atom, and consequently, an overall current database state that is visible to a transaction performed on a TE. In addition, and in accordance with an embodiment, the journal module 222 enables atom updates to be journaled to enforce durability of the SM. The journal module 222 can be implemented as an append-only set of diffs that enable changes to be written efficiently to the journal.

As shown, the example SM architecture 201 also includes a storage interface module 224. The storage interface module 224 enables an SM to write and read from physical (durable) storage that is either local or remote to the SM. While the exact type of storage (e.g., local hard drive, raid, NAS storage, cloud storage) is not particularly relevant to this disclosure, it should be appreciated that each SM within the distributed database system 100 can utilize a different storage service. For instance, a first SM can utilize, for example, a remote Amazon Elastic Block (EBS) volume while a second SM can utilize, for example, an Amazon S3 service. Thus, such mixed-mode storage can provide two or more storage locations with one favoring performance over durability, and vice-versa. To this end, and in accordance with an embodiment, TEs, SMs and SSMs can run cost functions to track responsiveness of their peer nodes. In this embodiment, when a node needs an atom from durable storage (e.g., due to a "miss") the latencies related to durable storage access can be one of the factors when determining which SM to utilize to service a request.

Snapshot Storage Manager Architecture

FIG. 2c depicts one example of the architecture 203 of an SSM (e.g., SSM 110) within the distributed database system 100, in accordance with an embodiment of the present disclosure. As will be appreciated in light of this disclosure, the example SSM architecture 203 is similar to that of the example SM architecture 201 as each node participates in peer-to-peer communication (e.g., utilizing language-neutral peer communication), and receives transaction-related messages from TEs. For instance, and as shown, SSMs can include the language-neutral peer communication module 216, the transaction module 220, the atom cache 210, the journal module 222, and the storage interface module 224 that enables each SSM to receive transactions, update atoms, and commit updates to durable storage (e.g., to implement ACID properties, and MVCC functionality) similar to that of an SM, as described above. However, as will be appreciated in light of this disclosure, the role of an SSM within the persistence tier 109 includes saving and addressing past database states in addition to the current database state, rather than just the current database state, as SMs do. As the distributed database system 100 can adhere to ACID properties, these past states are consistent point-in-time snapshots or "views" of the database at the particular point in time a transaction was committed. Note that snapshots are not necessarily created at an absolute point in time a transaction completes; rather, "point-in-time" generally refers to a state of the database, represented by a snapshot, relative to other transactions subsequently committing and manipulating database data. To this end, the point-in-time at which a snapshot is declared or otherwise created need not be, for example, at the precise moment the target transaction completes. In some embodiments, for instance, the point-in-time at which a snapshot is created can be any time after completion of the target transaction and before any other subsequent transaction further changes data of that snapshot. As discussed below with regard to FIG. 8b, these past database states may be queried in a read-only manner by, for example, a TE executing a SQL statement having syntax that largely comports with standard SQL syntax but with an additional keyword that identifies which snapshot to perform a query against.

Figure 3A:
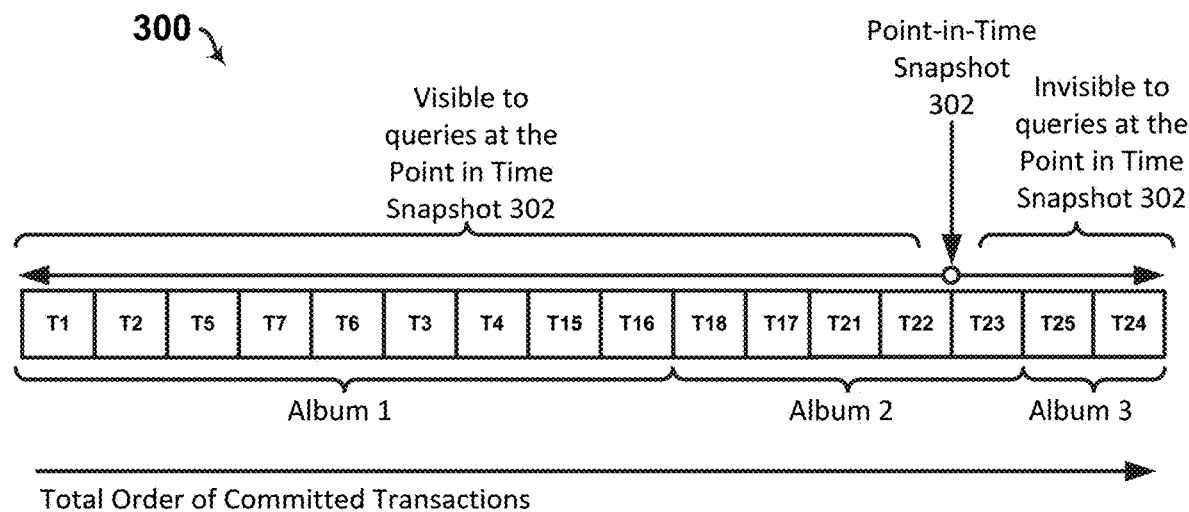
FIG. 3a depicts a block diagram illustrating a plurality of transactions received and arranged into a total order by an SSM after each transaction was committed by a given TE node, in accordance with an embodiment of the present disclosure.

Some aspects of snapshots can be better understood by way of illustration. Referring now to FIG. 3a, a block diagram illustrates a plurality of transactions (T1-T24) received and arranged into a total order 300 by an SSM after each transaction was committed by a given TE process, in accordance with an embodiment of the present disclosure. As discussed further below with regard to FIG. 2c, transactions can be organized into albums to enable bookkeeping tasks. Note that that if the distributed database system 100 includes two or more SSMs, the SSMs can coordinate to ensure that transactions are ordered identically across all SSMs, generally referred to herein as an SSM-agreed total order. Further note, the total order shown is consistent with the order in which transactions were committed by TEs, although it may not necessarily match their respective sequentially assigned transaction identifiers (T1-T24). This is because transactions can occur concurrently across multiple TEs. To make the order of commits of each SSM consistent with every TE, the sequence of transactions committed in some order by a TE should appear in that same order at each SSM. To make the order of commits consistent with record version visibility, as each transaction has its own consistent "view" of the database, the total order of the transactions at each SSM is also made consistent with the record version updates applied to atoms. To this end, each SSM agrees on an order that satisfies these ordering constraints, thus producing an SSM-agreed total order.

Figure 3B:
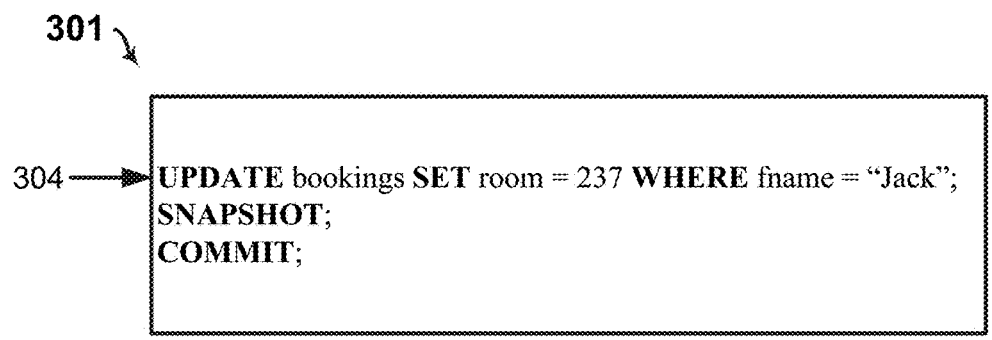
FIG. 3b illustrates one example transaction committed by a given TE, in accordance with an embodiment of the present disclosure.

In an embodiment, a snapshot manager module 226 can be configured to automatically declare a snapshot after each transaction commits. The snapshot storage manager is also optionally configured to declare snapshots if such a declaration is made explicitly within the transaction itself. For instance, since snapshots are transactional entities, snapshots can be declared and committed along with other data manipulation language (DML) as part of a transaction, such as inserts, deletes and updates. In general, only one snapshot is declared as part of a transaction, since the snapshots are transactionally consistent and do not expose an inconsistent state that is the result of partially-applied transactional effects or updates. If a snapshot is declared during a transaction, the snapshot will be logically applied atomically as part of the transaction, and includes the effects of the transaction (e.g., inserts, updates, deletes, and so on). The DML of the transaction is optionally structured such that a snapshot is declared as part of the commit statement itself. Since snapshots are part of transactional state, they are durable. In some cases, snapshots are stored as entries in write-head log file, or other location that correlates snapshots with respective transactions. The syntax of one such example transaction 301 is depicted in FIG. 3b. As shown, the DML 304, when committed, updates a plurality of data atoms in the form of version updates. For instance, the table "bookings" is associated with one or more table atoms and index atoms, just to name a few. To this end, an update to a record (a row having the column "room" equal to "237" and a field "fname" equal to "Jack") in the bookings table causes each of those related atoms to be updated. Thus, these atom-level updates result in each of these aforementioned atom types being modified to include new versions without overwriting previous versions. This ensures that other transactions that are co-occurring do not view an intermediate or otherwise incomplete data state within atoms (e.g., to comply with ACID properties and MVCC functionality); rather, they see a consistent view of an atom based on prior version states maintained therein. In the context of the example embodiment of FIG. 3a, this means that queries performed against the point-in-time snapshot 302 only "see" those database states that resulted from transactions to its left. Conversely, those versions of the database resulting from the transactions to the right are manifested and made durable within additional atom versions, but are otherwise invisible to a query performed against the point-in-time snapshot 302. So, in a general sense, a point-in-time snapshot is a way of viewing the entire database as it existed at the point in time a particular transaction was committed. As will be appreciated in light of this disclosure, snapshots are particularly useful when undoing recent changes (e.g., due to user error), performing database backups, and for gathering information about how data changes over time to empirically deduce trends and detect anomalies.

Figure 4:
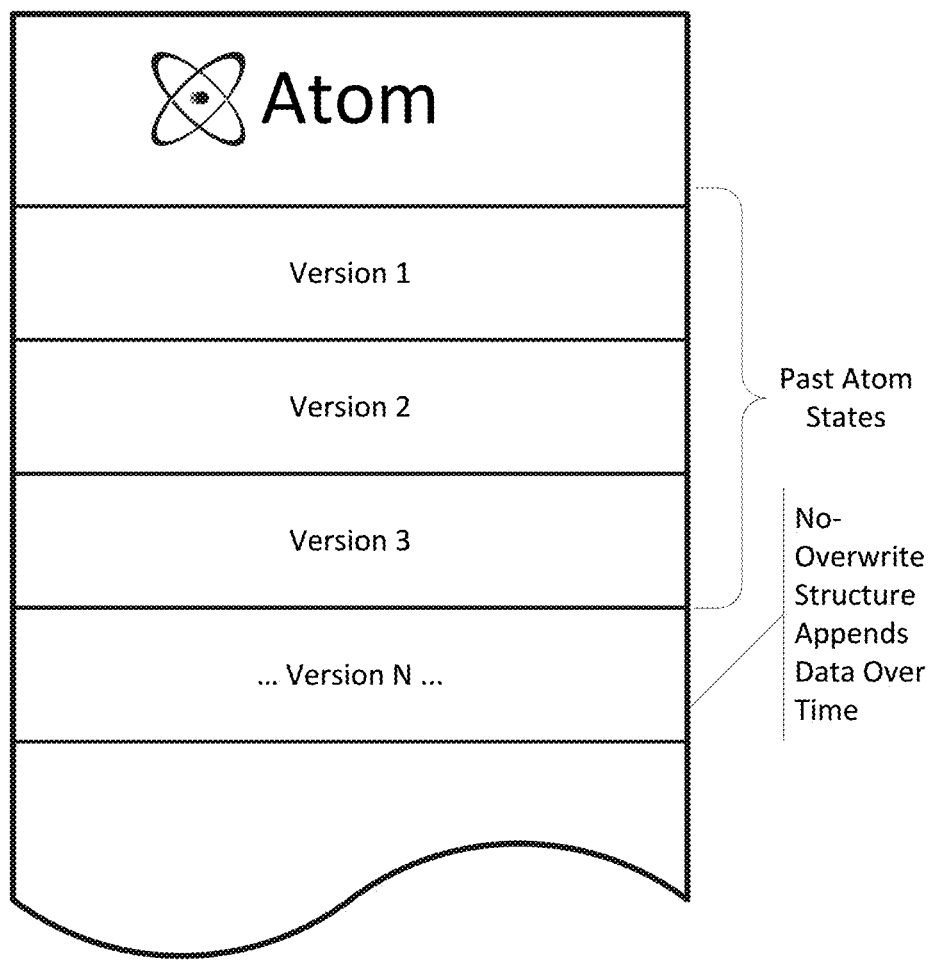
FIG. 4 depicts a block diagram illustrating the no-overwrite structure of an atom, in accordance with an embodiment of the present disclosure.

Referring to one specific example, FIG. 4 depicts a block diagram showing the no-overwrite structure of an atom, in accordance with an embodiment. As should be apparent in light of this disclosure, multiple versions are maintained within each atom. Versions are created when users modify database data (e.g., insert, update, and delete all create new versions rather than modify or remove existing versions). In an embodiment, these prior versions are culled to insure that atoms do not grow indefinitely, and consequently consume an unnecessarily large amount of space in atom caches and durable storage. For example, a garbage collection task can identify old versions that can be safely deleted or otherwise de-allocated. Such space reclamation processes within the context of the SSM will be discussed further below.

Returning to FIG. 2c, the snapshot manager module 226 can be configured to associate transactions into logical groupings called albums. Albums can comprise a collection of transactions that correspond to a logical grouping of transactions in the total order, such as the total order shown in FIG. 3a. In certain embodiments, albums can be used to efficiently perform bookkeeping tasks related to ordered lists of update transactions (e.g., garbage collection). In such embodiments, a snapshot optimization and aging policies module 228 governs, for example, the maximum amount of time an album is kept open before it is closed, a maximum number of transactions or snapshots recorded in an album, and other album-related policy parameters. Albums can also be utilized when reconstructing a database state to satisfy a point-in-time query, as discussed below with regard to FIG. 8a.

A database that keeps multiple versions of data for the purpose of servicing queries already contains some information needed for maintaining snapshots. However, allowing atoms to "grow" in size without limit can have a negative impact on query performance, cause the database to consume an unbounded amount of space, and make it difficult to enforce data retention policies. Thus, in one embodiment, the distributed database system 100 periodically removes versions of data from atoms in the atom cache via a garbage collection task when those versions are no longer needed. To ensure that an SSM can still address the complete database state in a snapshot even if old versions are removed from atoms periodically via garbage collection, an SSM "freezes" atoms, for example by making an immutable copy of the atom versions prior to removing unneeded versions. This freezing enables those atom copies to be uniquely identified and to be stored in durable storage to preserve atoms containing versions used in a snapshot. Without freezing, these versions could otherwise become inaccessible after being removed from atoms in the current database state. As will be discussed below with regard to FIGS. 7A-7C, this means that a given SSM can maintain a current version of each atom (similar to SMs) in addition to one or more frozen copies of atoms that extend visible or otherwise queryable versions. Thus, point-in-time queries can be performed by TEs using past-state atoms requested from SSMs, and those point-in-time queries can "see" full read-only versions of the database going back to the point at which SSM archive activities began within the distributed database system 100, or to the extent that durable storage limits permit. In operation, this means that snapshots will result in more storage space being consumed than had just the current state of the database been maintained. In an embodiment, high-capacity physical storage locations can be utilized by the storage interface module 224 to compensate for the additional space needed.

Figure 5:
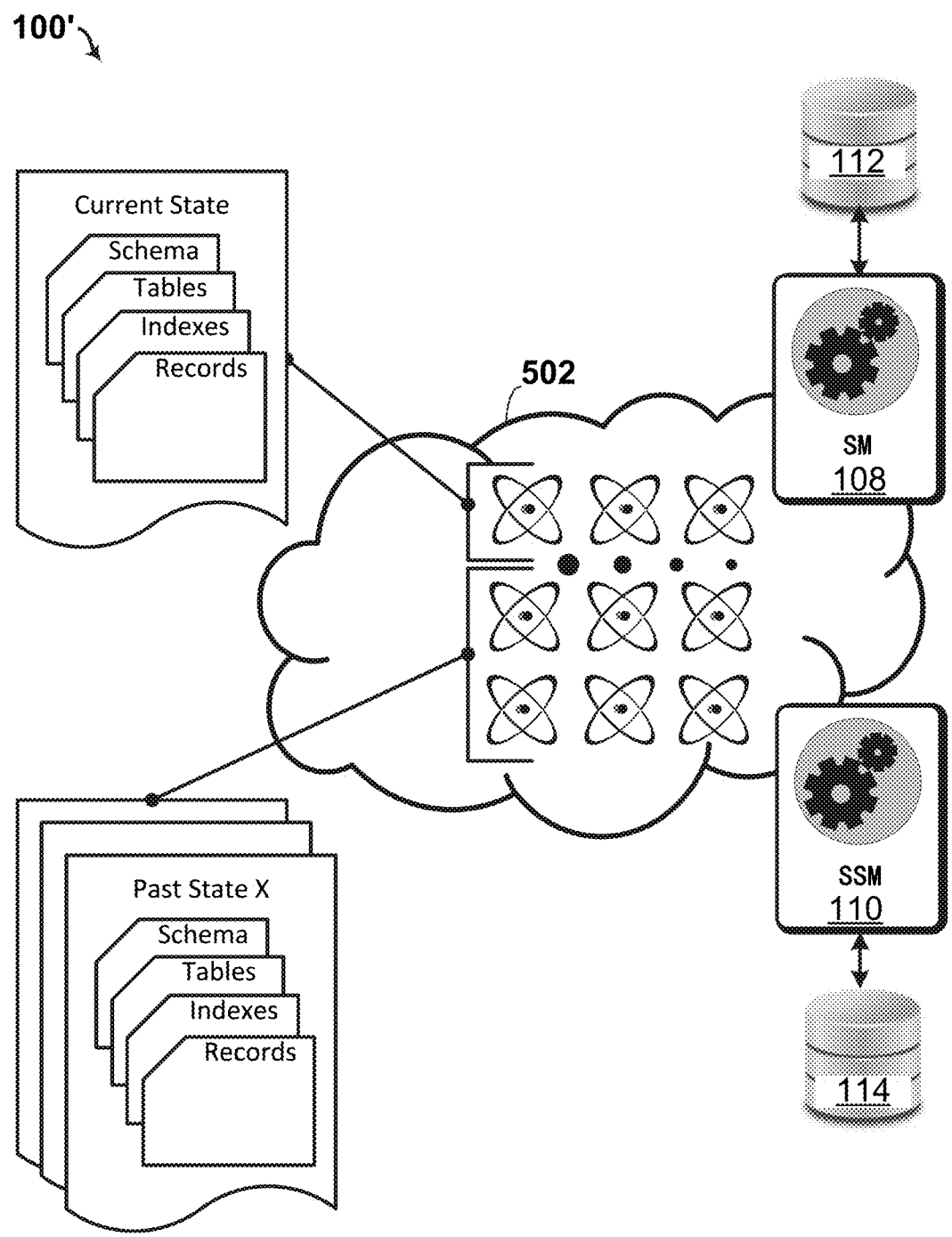
FIG. 5 depicts a block diagram representing another example embodiment of the distributed database system of FIG. 1 configured to transparently provide client-level access to current and past database states, in accordance with an embodiment of the present disclosure.

Now referring to FIG. 5, a block diagram represents one example embodiment 100' of the distributed database system 100 of FIG. 1 configured to transparently provide client-level access to current and past database states, in accordance with an embodiment of the present disclosure. As should be appreciated, the example embodiment 100' shown in FIG. 5 is an abbreviated view of the distributed database system 100, and to this end, nodes such as the SQL clients 102, management agents 104, and TEs 106a-106c have been excluded merely for clarity and ease of description. Further, it should be appreciated that a plurality of SMs and SSMs could be deployed (e.g., to scale out a given database system) and this disclosure it not limited to only the number shown.

As shown, the plurality of atoms within a DDC 502 represent both current- and past-states of a database. As discussed above with regard to FIG. 1 and FIGS. 2A-2C, each database node owns or otherwise manages an atom cache (in RAM), that is a component part of the collective DDC. Recall that atoms can be retrieved from durable storage (e.g., due to misses), and communicated between respective atom caches during performance of transactions. Thus DDC 502 is a flexible cache that enables clients (e.g., SQL clients 102) to "see" a single, logical database. As shown in FIG. 5, those atoms representing the current state can be made durable within the durable storage location 112 of the SM node 108. In addition, those atoms representing the current state and the past states can be made durable within the durable storage location 114 of the SSM node 110. As will be appreciated in light of this disclosure, by maintaining the current state of the database, the SSM can incrementally save changes occurring to the database and "freeze" atoms as necessary to ensure availability of past states.

As will be discussed further below, with the presence of at least one SSM within the distributed database system 100, a client can perform transactions that cause those atoms related to past states of a database to be loaded into the DDC 502. Within the context of the distributed database system 100, this means that atom caches of TEs can be populated with those atoms that are pertinent to point-in-time queries. However, in some instances this may cause an undesirable performance drop since the TE will be performing both transactions on current-state data and point-in-time transactions on previous-state data. This mixed transaction workload can cause system latency due to atom caches having a finite amount of volatile memory available. In particular, atoms that are removed from cache to free memory may need to be reacquired later from another atom cache or from durable storage. This removal scenario is the result of so-called "cache pollution" and can detract from the performance of critical transactions (e.g., those transactions that seek to query, insert, update, and delete current-state data). In accordance with an embodiment, cache pollution can be eliminated or otherwise mitigated by physically separating nodes that run SM and SSM nodes, in addition to optionally providing one or more TE nodes that are dedicated to point-in-time workloads.

Figure 6:
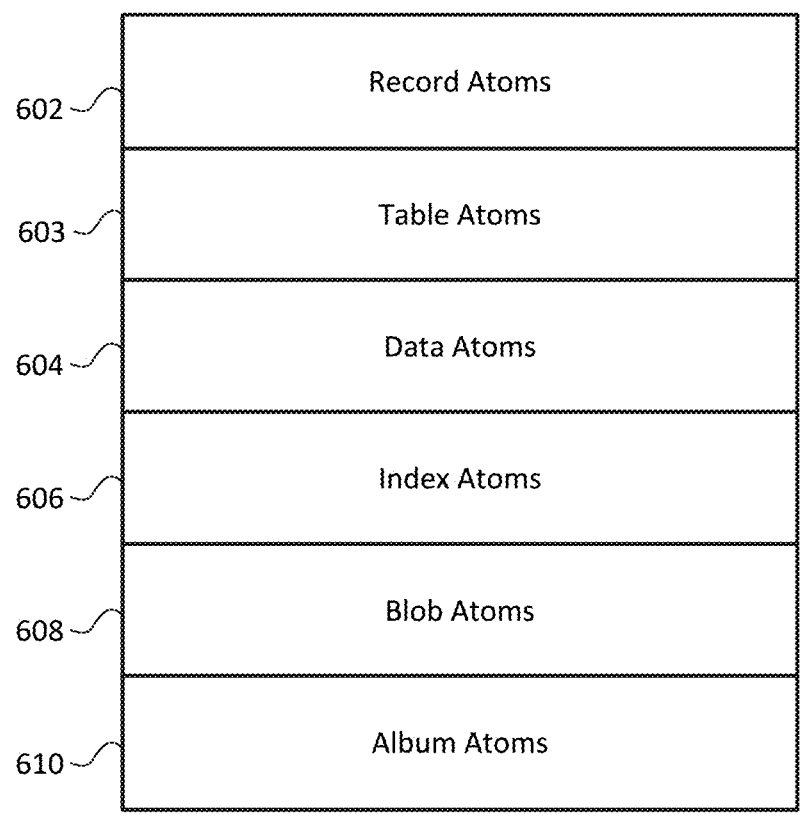
FIG. 6 depicts a block diagram illustrating atom types that may be frozen and stored within durable storage of an SSM to enable point-in-time queries of past database states, in accordance with an embodiment of the present disclosure.

Referring now to FIG. 6, a block diagram illustrates atom types that may be frozen and stored within durable storage of an SSM to enable point-in-time queries of past database states. As shown, this includes record atoms 602, table atoms 603, data atoms 604, index atoms 606, blob atoms 608, and album atoms 610. In the embodiment, table atoms 603 can contain metadata about tables such as the names and types of its columns; record atoms 602 and data atoms 604 can contain table row data and metadata about table row visibility; index atoms 606 can contain metadata and data about table indexes; blob atoms 608 can contain binary large object data and are associated with table atoms similar to record and data atoms; and album atoms 610 can contain metadata about logical groupings of transactions in the SSM-agreed total order. It should be appreciated that other database-related atoms can be frozen and the aforementioned list is not exhaustive or intended to be limiting to the present disclosure.

Methodologies and Operation

As discussed above, each database node of the transactional tier 107 and the persistence tier 109 can comprise modules that enable a DDC. In an embodiment, this DDC enables atom updates to propagate throughout the distributed database system 100 before a transaction commits. In operation, this means that each database node (e.g., TEs 106a-106c, SM 108 and SSM 110) can receive replication messages from TEs (e.g., utilizing communication network 101) as transactions are performed. In an embodiment, the replication messages include DML, or an equivalent thereof, that specifies data manipulations and the atoms containing the data to be manipulated. For instance, the data manipulations can be insert and delete operations on database objects.

Figure 7A:
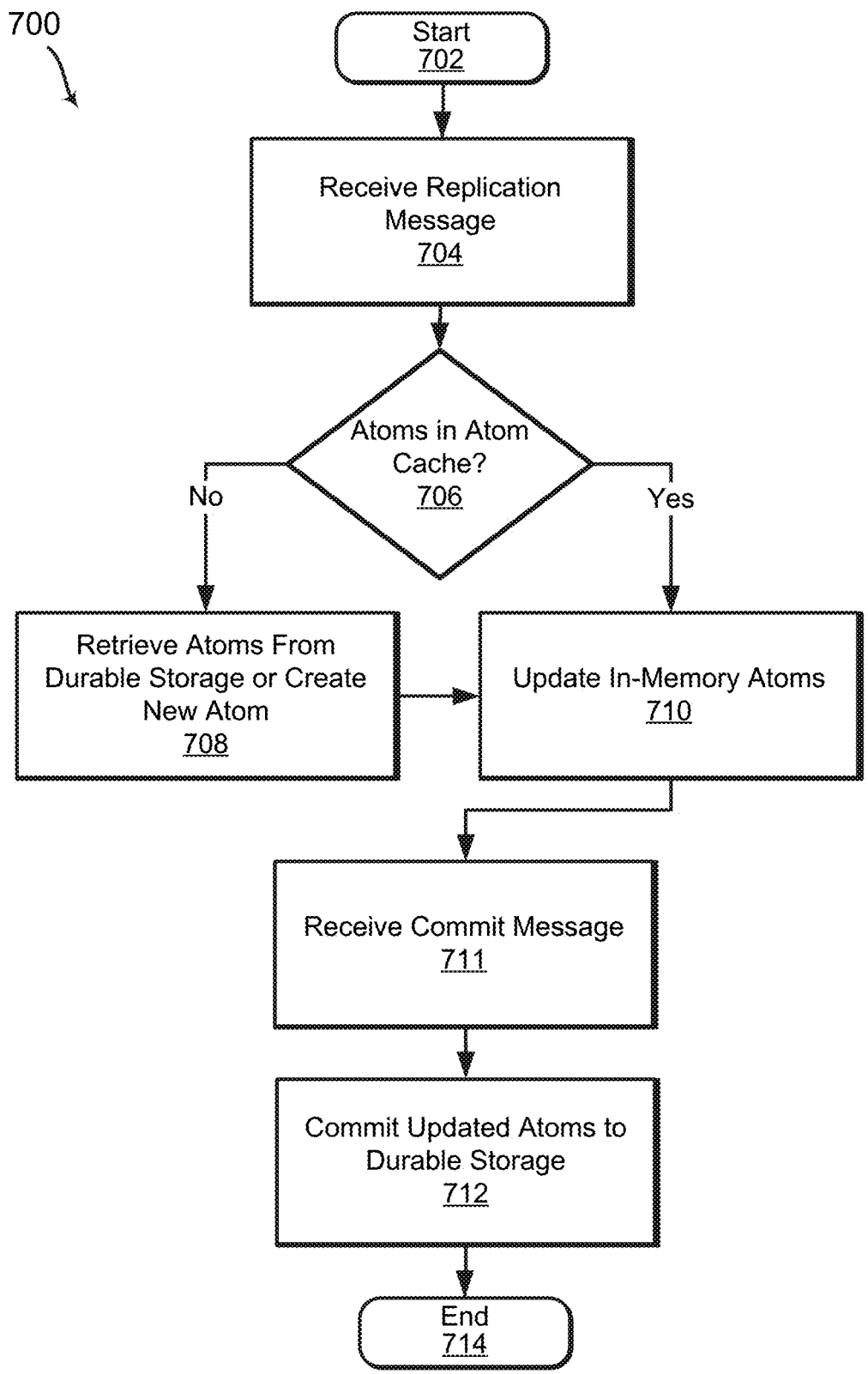
FIG. 7a shows one example methodology for enabling symmetrical atom updates across multiple database nodes within a persistence tier of the distributed database system of FIG. 1, in accordance with an embodiment of the present disclosure.

Referring now to FIG. 7a, one example methodology 700 is shown for enabling symmetrical atom updates across multiple database nodes within persistence tier 109 (e.g., SMs and SSMs). This methodology may be implemented, for example, by the distributed database system 100 of FIG. 1, and more particularly by SM 108 and SSM 110, although numerous embodiments will be apparent in light of this disclosure. As shown, methodology 700 includes acts of receiving a replication message, determining if an affected atom is in the atom cache, retrieving atoms from durable storage or creating new atoms if an affected atom is not in the atom cache, updating in-memory atoms, and committing those updated atoms to durable storage. The method 700 begins in act 702.

In act 704, a given SM or SSM receives a replication message through the communication network from a TE performing a transaction. In an embodiment, DML, or an equivalent thereof, that specifies data manipulations can be translated to modifications to atoms by the TE and those modifications can be replicated to other TEs caching those atoms and all SMs and SSMs using the replication messages. In an embodiment, replication messages identify an atom and at least one data manipulation to be performed thereon. For example, some such data manipulations include creating a new record version in a record atom.

In act 706, the given SM or SSM determines if the replication message affects any atoms not presently loaded into the atom cache. Recall that each of the SMs and SSMs store a full copy of a database. Those atoms most recently retrieved from durable storage (e.g., durable storage locations 112 and 114) can be in the respective atom cache. If the replication message affects only those in-memory atoms, the method 700 continues to act 710. If the replication message affects at least one atom not presently loaded into the atom cache, the method continues to act 708.

In act 708, the given SM or SSM retrieves one or more atoms from durable storage. Alternatively, or in addition to retrieving one or more atoms from durable storage, the SM or SSM can create new (empty) atoms that can be used when transactions performed at a TE cause new data database objects to be created (e.g., new indexes, tables, columns, rows, and blobs). In any such cases, the given SM or SSM can create and/or retrieve those atoms and load them into their respective atom cache.

In act 710, the given SM or SSM performs the data manipulations included within the received replication message on those atoms identified therein. Identified atoms can also include atoms which do not presently exist (e.g., based on an insert), but were created by a TE to satisfy a transaction. The given SM or SSM can request these newly created atoms from TEs prior to performing the data manipulations. In other cases, the identified atoms may be in the atom cache 210 of the given SM or SSM, or available in the atom cache 210 after marshalling the identified atoms from durable storage. As discussed above, these data manipulations can comprise DML, or an equivalent thereof, that causes atoms to be updated in a manner that alters the database objects represented within those atoms. As discussed above with regard to FIG. 4, this can include appending or otherwise adding additional version states to each affected atom. Within the context of ACID properties and MVCC functionality, this enables each transaction to manipulate database data without causing concurrent transactions to see an intermediate or otherwise invalid database state.

In act 711, the given SM or SSM receives a commit message from a TE after a transaction has successfully completed. In act 712, the given SM or SSM commits mutations to those atoms updated in-memory to durable storage. In an embodiment, the commit message can comprise a replication message, or other suitable message, that identifies a transaction and the commit operation. In response to the commit message, the given SM or SSM executes one or more commands causing each affected atom to be saved into durable storage, such as durable storage locations 112 and 114. Note that such atom mutations may first be written to a journal (e.g., utilizing the journal module 222), with those changes being written to disk at a later point (e.g., utilizing a lazy write methodology). The methodology 700 ends in act 714.

Figure 7B:
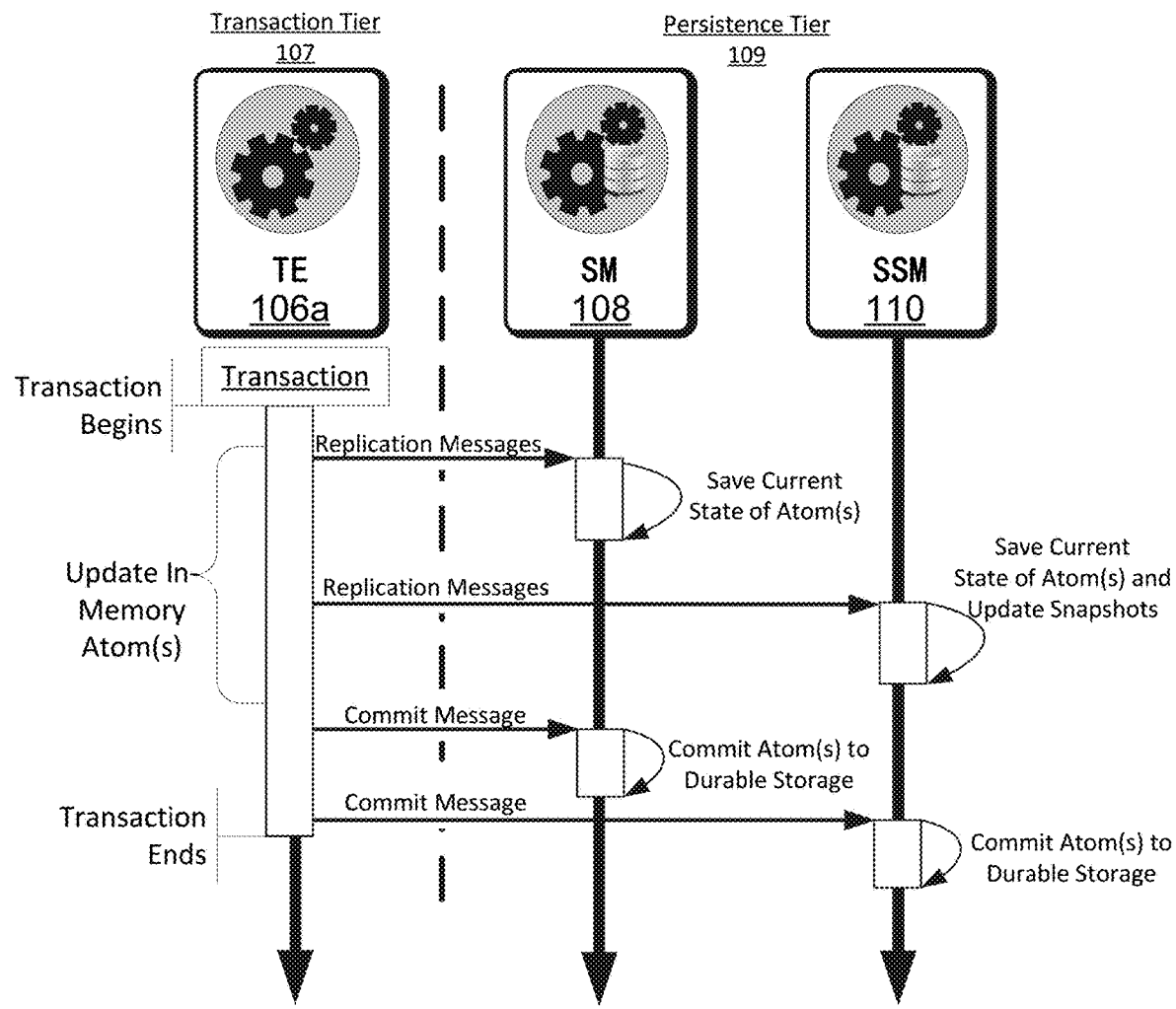
FIG. 7b shows one example data flow of the symmetrical atom update methodology of FIG. 7a, in accordance with an embodiment of the present disclosure.

Referring now to FIG. 7b, one example data flow of the symmetrical atom update methodology 700 is illustrated, in accordance with an embodiment of the present disclosure. As shown, a transaction begins at a first point in time at the TE 106a. For instance, the example transaction 301 of FIG. 3b may be sent from one of the SQL clients 102 to TE 106a, where it is parsed using the language-neutral peer communication module 216. During the course of performing a given transaction, the TE 106a can update those atoms representing database data that is to be manipulated according to the specified DML within the given transaction. As shown, this includes the TE 106a performing in-memory updates in volatile memory (e.g., utilizing an atom cache). In addition, and in accordance with an embodiment, the TE 106a can request atoms from any other peer database node, particularly those having a low-latency connection with the TE 106a, that implements the atom cache module 210.

In an embodiment, in-memory updates to a particular atom at the TE 106a are replicated to other database nodes having a copy of that atom. For example, and as shown, replication messages are sent to the SM 108 and the SSM 110 which identify one or more atoms and changes to those atoms. In an embodiment, the replication messages sent to the SM 108 and SSM 110 can be the same or substantially similar, enabling both the SM 108 and the SSM 110 to process the same replication message in a symmetrical manner. It should be appreciated that replication messages can be sent at any time during operation of a TE 106a, including concurrently, and are not necessarily sent in a particular order shown in the example embodiment of FIG. 7b. As should be appreciated, and in accordance with an embodiment, this symmetrical replication procedure is particularly advantageous as a same message can be broadcast to multiple TEs, SMs, and SSMs within the distributed database system 100.

As discussed above with regard to FIG. 1, to enable transactional consistency during performance of concurrent transactions, and to reduce lock-related latencies (e.g., by implementing MVCC), updates to atoms are manifested as multiple atom versions. One such example atom including multiple versions is shown in the example embodiment of FIG. 4. Thus, the SM 108 and the SSM 110 can each update its own local copy (e.g., within its atom cache) of a given atom based on the replication messages received from the TE 106a. Within the context of the SSM 110, it should be appreciated that a replication message not only updates the current state of an atom, but also is the catalyst for transactions being associated with a snapshot (if declared within the transaction or otherwise enabled). In one implementation all SM nodes within the management domain 111 that receive a given replication message perform identical operations, thus synchronizing all such updates across the distributed database system 100.

Recall that updates are not committed to durable storage until a transaction fully commits. Thus, these in-memory changes to atoms shown in FIG. 7b can be efficiently "rolled back" if a transaction fails. In an embodiment, a commit message is sent at the end of a transaction to each of the SM 108 and the SSM 110 to finalize in-memory changes and cause the SM 108 and the SSM 110 to schedule (e.g., utilizing the journal 222) those atom changes to be written to durable storage (e.g., utilizing the storage interface module 224).

Figure 7C:
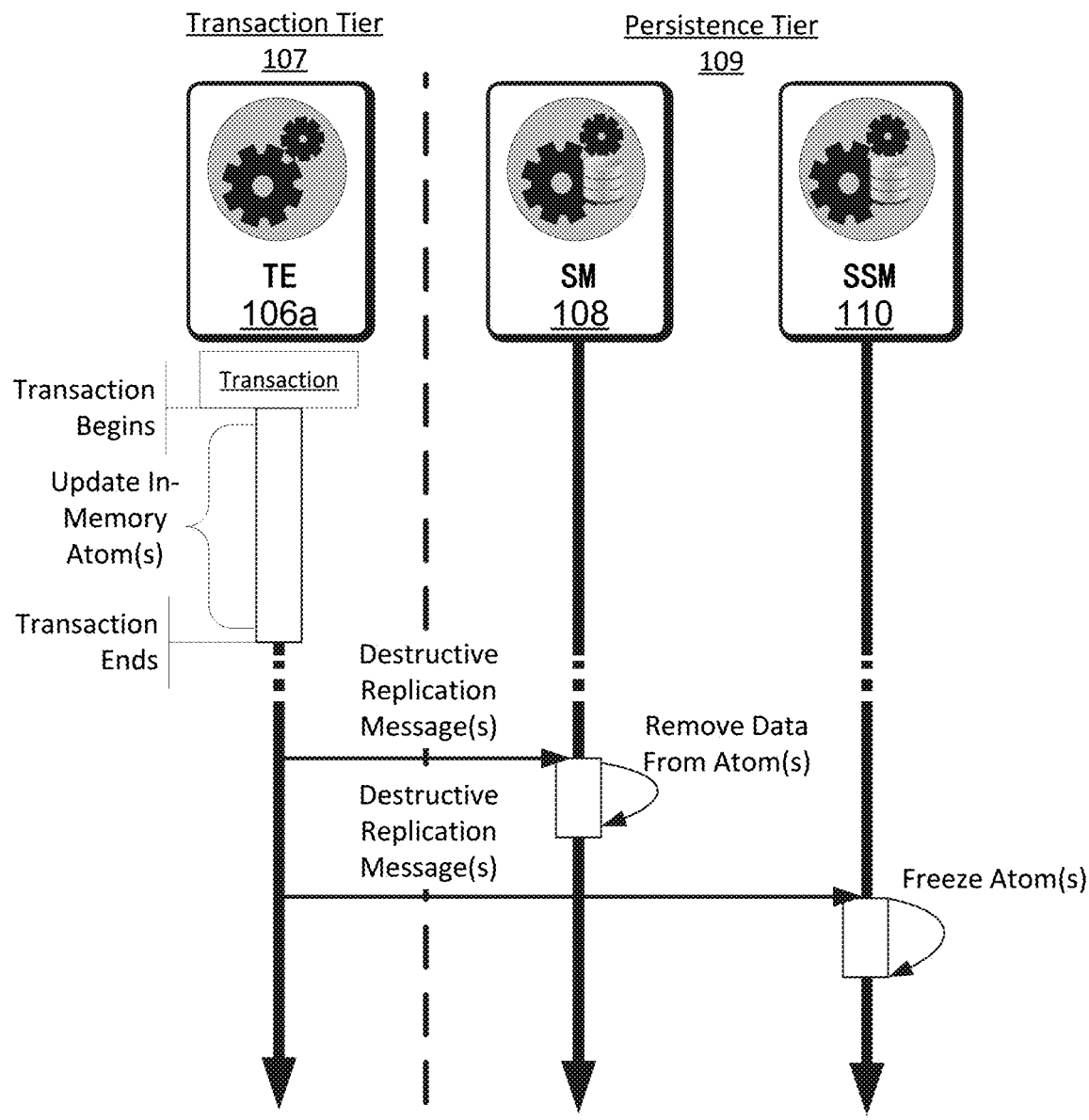
FIG. 7c shows one example data flow of the symmetrical atom update methodology of FIG. 7a during destructive replication processes, in accordance with an embodiment of the present disclosure.

Referring now to FIG. 7c, one example data flow of the symmetrical atom update methodology 700 of FIG. 7a during the processing of a destructive replication message is shown, in accordance with an embodiment of the present disclosure. As shown, a transaction is executed (e.g., by a SQL client) at the TE 106a. During performance of the transaction, atom updates occur and are propagated throughout the distributed database system 100 utilizing replication messages as discussed above with regard to FIGS. 7a and 7b. Recall that atoms can retain a number of versions (including a current version) but that they cannot grow indefinitely. Periodically, versions of data can be removed by a garbage collection task. The node performing garbage collection (e.g., TEs 106a-106c) informs other nodes about the removal of data versions by sending replication messages. Because these replication messages concern the destruction of data versions they can be accurately described as destructive replication messages. In addition, it should be noted that in some cases atoms may be deleted due to, for example, a table being dropped, a record being deleted, an index being deleted, and other destructive events. The replication messages concerning these events can also be accurately described as destructive replication messages. These destructive actions may be performed in a lazy manner and governed by, for example, a space reclamation task that is periodically performed on each TE (e.g., TEs 106a-106c).

As shown, and in accordance with an embodiment, the TE 106a can periodically send one or more destructive replication messages to the SM 108 and the SSM 110. It should be appreciated that destructive replication messages can be sent at any time during operation of a TE 106a, including during the performance of transactions. Destructive replication messages are not necessarily sent in a particular order shown in the example embodiment of FIG. 7c. In an embodiment, the destructive replication message is similar to that of a replication message, as discussed above, but contains instructions that identify one or more atoms and/or atom versions therein to be removed. This contrasts with non-destructive replication messages that only cause atoms to be created or that add new atom versions into existing atoms.

As shown, in response to the SM 108 receiving the destructive replication message, the SM 108 removes atoms, or atom versions therein, identified within the destructive replication message. In an embodiment, the SM 108 then marks or otherwise causes garbage collection to occur to reclaim the space consumed by these atoms or atom portions which are to be removed. In this embodiment, the SM 108 may serialize a new version of the atom (e.g., minus the removed versions) to durable storage, or entirely remove an atom from durable storage and update a catalog, as necessary. Note that a destructive replication message does not require a commit message prior to changes being made durable, unlike the replication processes discussed above. Further note that frozen atoms may still be stored in durable storage by logging destructive replication messages. For example, in the event of a crash, frozen atoms can be recreated by applying destructive replication messages from a log to corresponding current-state atoms, provided that frozen versions of an atom in the cache are written prior to the cached current-state version of that atom. It should be appreciated that all such SM nodes within the management domain 111 receiving a given destructive replication message perform an identical operation, thus synchronizing all such changes across the distributed database system 100. However, and of particular note, an SSM receiving such a destructive replication message performs an additional operation that causes an atom, or versions therein, to be "frozen" and copied into durable storage. After this, the SSM can also perform similar operations to an SM so that its current state remains synchronized with the current state of other SMs and SSMs within the distributed database system 100.

For example, and as shown in the specific example data flow of FIG. 7c, a destructive replication message is received by the SSM 110. As a result, and in accordance with an embodiment, the SSM 110 copies those atoms, or portions thereof (e.g., historical versions), and saves a read-only copy of such data in one or more so-called "frozen" atoms. Frozen atoms allow SSMs 110 to address (e.g., make queryable) not only current versions of a database but past states as well. These frozen atoms can be retrieved from durable storage by the SSM 110, and loaded into the atom cache in a manner similar to other non-frozen atoms, and without any particular special handling by the distributed database system 100 (other than adhering to the read-only properties). This enables TEs to perform point-in-time queries utilizing the SSM 110 and view consistent versions of the database as it existed at the time of each snapshot. Note that each SSM contains a consistent current version of a database in addition to snapshots of prior versions of the same. To this end, and in accordance with an embodiment, point-in-time queries may be serviced by a given TE by retrieving current state atoms (e.g., from TEs, SMs, and SSMs) or frozen atoms retrieved from TEs also caching those frozen atoms, or from SSMs, or a combination of current state atoms and frozen atoms, and loading those atoms into the TE's atom cache. All or a portion of a given point-in-time query may be serviced by one or more peer nodes of the database, and by both frozen and current state atoms from those peer nodes, as the case may be.

Figure 8A:
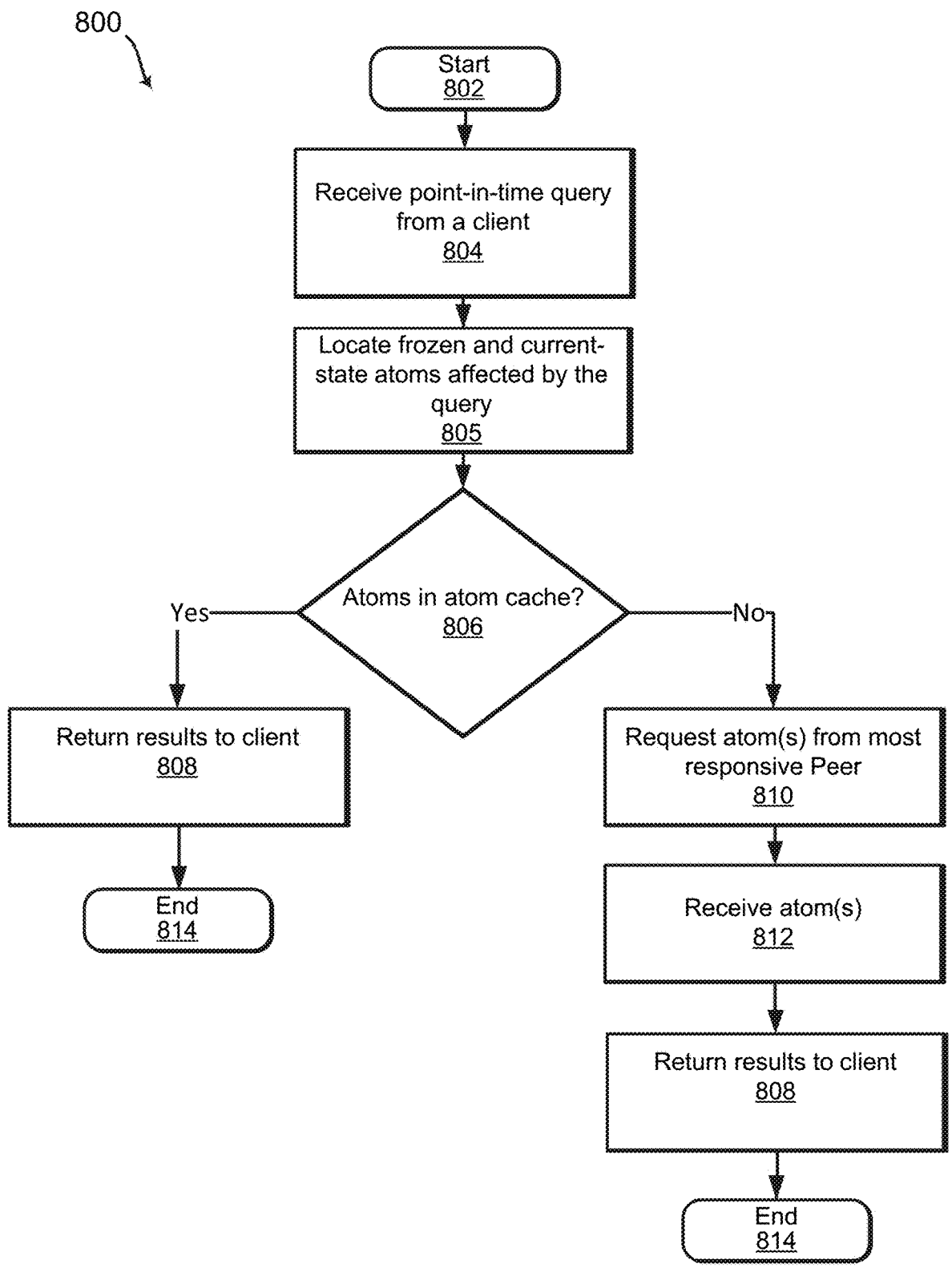
FIG. 8a shows one example methodology for performing point-in-time queries by a TE within the distributed database system of FIG. 1, in accordance with an embodiment of the present disclosure.
Figure 8B:
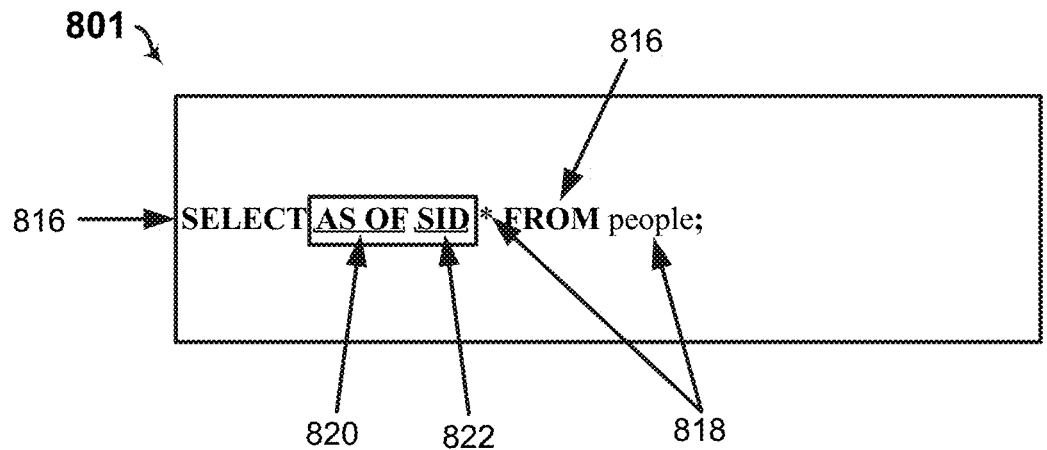
FIG. 8b shows one example point-in-time query that can be serviced by the distributed database system of FIG. 1, in accordance with an embodiment of the present disclosure.

Referring now to FIG. 8a, one example methodology 800 for performing point-in-time queries by a TE is shown in accordance with an embodiment of the present disclosure. A point-in-time query enables users to query past states of the database "as of" a particular point in time. This methodology may be implemented, for example, by the distributed database system 100 of FIG. 1, and more particularly by TEs 106a-106c, although numerous embodiments will be apparent in light of this disclosure. The method 800 begins in act 802. In act 804, a TE (e.g., TE 106a-106c) receives a point-in-time query from a client, such as the SQL clients 102. One such example point-in-time query 801 is shown in FIG. 8b. As shown, the example point-in-time query 801 comprises standard SQL syntax 816 for querying and a target database object 818. In addition, and as will be appreciated in light of this disclosure, some aspects of the present disclosure include an extension to the SQL vernacular to enable snapshot identification for query purposes. To this end, and in accordance with an embodiment of the present disclosure, the distributed database system 100 can include TEs configured to parse additional SQL syntax. As shown, point-in-time query 801 includes some such additional SQL keywords 820 that include a snapshot identifier 822. Although specific keywords 820 ("as of") are shown in FIG. 8b, it should be appreciated that other terms can be utilized in other embodiments.

In some cases, the snapshot identifier 822 can be a symbolic name of a snapshot (e.g., a globally-unique identifier (GUID) or other unique identifier), a date and/or time associated with the snapshot, an alias, a user-defined label, or any other identifier that is unique to a given snapshot. In other cases, the snapshot identifier 822 can be a so-called "rough" or otherwise inexact user-specified timestamp used to query a past state of a database based on an arbitrary point in time. In any such cases, a client and/or a TE can determine snapshot availability by, for example, querying a table that includes a list of snapshots and details related to each snapshot.

Figure 8C:
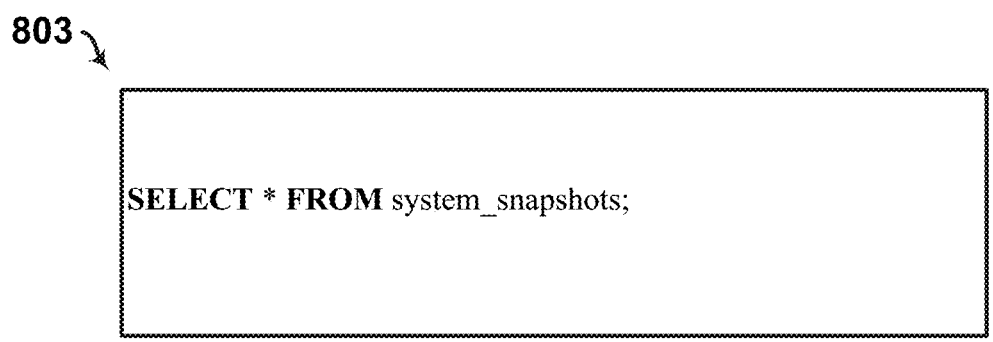
FIG. 8c shows one example query that can be executed by a TE to determine whether a snapshot identified in a point-in-time query is available within distributed database system, in accordance with an embodiment of the present disclosure.

For example, as shown in FIG. 8c an example query 803 can be executed by a TE to determine or otherwise validate the snapshot identified in the query is available within distributed database system 100. In other examples, and as discussed below, a client can perform a query to determine what snapshots are available for querying. In any such cases, the results of one such example query 803 are shown in the example result set 824. As shown, the result set 824 includes a snapshot ID and metadata 826 (e.g., timestamp when snapshot was performed) for each respective snapshot. As discussed above, snapshot identifiers and associated metadata are designed to uniquely identify each snapshot, for example based on a timestamp or some other unique property. To this end, the example result set 824 should be not viewed as limiting the present disclosure. In addition, the example shown in FIG. 8b is not necessarily the SQL query a TE would execute when validating the existence of a snapshot identified in a query. For example, the TE can utilize the snapshot identifier 822 to more efficiently query for whether a specific snapshot exists within the distributed database system 100 (e.g., where id=snapshot_identifier).

It should be appreciated that the TE can utilize the SQL parser module 204, the optimizer module 206, and other parser-related modules to ensure that point-in-time queries comport with standard SQL syntax and are executed efficiently. To this end, the validating aspects of determining if an identified snapshot is available, as discussed above, can be integrated within a TE and utilized to validate point-in-time queries. It should be appreciated that the TE can perform additional validation routines. For instance, if no SSM is available to service a point-in-time query, the TE may send an error or exception back to a client indicating no available SSMs are available.

In an embodiment, a TE can be preconfigured to statically "point" at a snapshot without an explicit reference within a query. For example, a TE may be configured to always perform queries based on a particular user-selected snapshot such that all queries are executed with an implicit "as of" declaration. To this end, a client does not necessarily know that the result sets returned are from past states of the database. This can be particularly advantageous when, for example, a database Administrator wants to execute analytic queries on past states without having to modify underlying application code (e.g., to add "as of" syntax to SQL queries) that may not be accessible (e.g., may be hard-coded or otherwise compiled into an application). So, a TE may be configured to view a particular past state of a database without a client having specific knowledge or special syntax within queries.

Returning to FIG. 8a, once the point-in-time query has been received, in act 805 the TE locates frozen and current-state atoms affected by the point-in-time query. It should be appreciated that the atom to SQL mapping module 208 enables the TE to determine which atoms are affected by a given query based on the database objects referenced in the query. One example of how affected atoms are located in frozen or current-state form to satisfy the point-in-time query will now be discussed.

As discussed above with regard to FIG. 3a, transactions are arranged by an SSM into a total order based on when transactions are received by the SSMs. Thus albums comprise a collection of transactions as arranged in the total order. Furthermore, a transaction may be associated with a snapshot. As discussed below, atoms, and versions therein, can be culled from time-to-time to reclaim space. To ensure that snapshots continuously point to the correct data, atoms may be "frozen" by making a copy of them and marking the copy read-only (the copy is eventually written into durable storage of an SSM). So, while initially each transaction is associated with current-state atoms, over time those atoms become frozen because, for example, versions of data in atoms may be removed during space reclamation processes. Each album can reference one or more frozen atoms in order to reconstruct a version of the database that satisfies a given point-in-time query. When an atom is frozen, that frozen atom is referenced by a last-closed album at the time the atom is frozen. So, all frozen atoms associated with a snapshot are guaranteed to be referenced by the album to which the snapshot belongs, or some album closed at a later time.

Consider that the snapshot 302 of FIG. 3a is the snapshot identified by the point-in-time query received in act 804. The TE can determine what album a snapshot belongs to based on, for example, a map that associates snapshots with a corresponding album. As shown, the snapshot 302 is associated with Album 2. So, the TE can perform a lookup that checks if Album 2 has associated frozen atoms that are affected by the point-in-time query, and if so, constructs a list of those frozen atoms along with the location of an SSM node where those frozen atoms are stored. The TE can continue performing this lookup on each additional album closed after Album 2 (appearing to the right of Album 2 in FIG. 3*a*) until the newest album is reached (e.g., Album 3). By iterating through each album up to the newest album, the TE can guarantee that all atoms that existed when the point-in-time snapshot 302 was declared can be located. Note that some of the atoms affected by the point-in-time query may not have been frozen in Album 2, but may have been subsequently frozen and associated with another album. So, the TE traverses each album to ensure that each affected atom can be located in a frozen form, if necessary, to satisfy the point-in-time query. Also consider that some atoms associated with the snapshot may not be frozen yet. Any atom not found via the aforementioned lookup procedure will not be frozen, and so will be retrieved from the current-state rather than from an album.

In act 806 the TE determines if the current-state and frozen atoms affected by the point-in-time query identified in act 805 are within the TE's atom cache. If all affected atoms are within the atom cache, the TE returns a result set to the client in act 808 exclusively from the atom cache. As will be appreciated in light of this disclosure, this enables queries to be efficiently serviced without incurring latencies related to disk-access (e.g., "misses"), or round-trips related to requesting atoms from peer nodes. If the point-in-time query affects any atoms not in the atom cache, the methodology 800 continues to act 810. As will be discussed below, each point-in-time query can be serviced by present state atoms and/or frozen atoms.

It should be appreciated that the result sets from point-in-time queries and standard queries are not atoms per se; rather, they are in a form that comports with the data structures anticipated by a given client. For instance, a SQL client receives SQL-compatible result sets without regard for the underlying atom-structure of those results. Some such SQL-compatible result sets include columns, rows and values of records located by a query and serialized or otherwise formatted in a manner that comports with a given configuration of the SQL client performing the query. In an embodiment, this translation from atom to a SQL-compatible result set can also be performed by the SQL mapping module 208.

In act 810, those atoms that are not available in the atom cache are requested from a most-responsive or otherwise low-latency peer database node. This includes both current-state and frozen atoms needed to service the point-in-time query. As discussed further below with regard to FIG. 8*d*, in one implementation the TE can mitigate latencies by requesting atoms from those database nodes that have the lowest ping or are otherwise known to have the fastest round-trip response (e.g., in milliseconds). In an embodiment, the frozen atoms identified in act 805 can be requested from an SSM. Note that point-in-time queries are not necessarily limited to servicing by only SSMs. For instance, a peer TE node that has one or more atoms pertinent to a point-in-time query can be utilized to fulfill a point-in-time query in full or in part. Moreover, in some cases point-in-time queries may be associated with current-state atoms (e.g., if the atoms have not changed since the snapshot), and those current-state atoms can be requested from TEs or SMs and also be utilized to fulfill a point-in-time query in full or in part. Thus point-in-time queries can be serviced by leveraging the distributed database system 100 to locate the relevant atoms and satisfy a given point-in-time query as efficiently as possible. In addition, the TE can satisfy a point-in-time query by retrieving current-state atoms and/or frozen atoms, with those atom requests being serviced by one or more TEs, SMs, and SSMs.

In act 812, the TE receives one or more atoms requested in act 810. In an embodiment, at least one of a TE, a SM, and an SSM communicates the requested atoms to the TE to service the point-in-time query. In act 808, the TE performs atom-to-SQL mapping to construct a result set that comports to the requirements of the client (e.g., a SQL-compatible result set), and communicates the constructed result set to the client. In act 814, the methodology 800 ends.

Figure 8D:
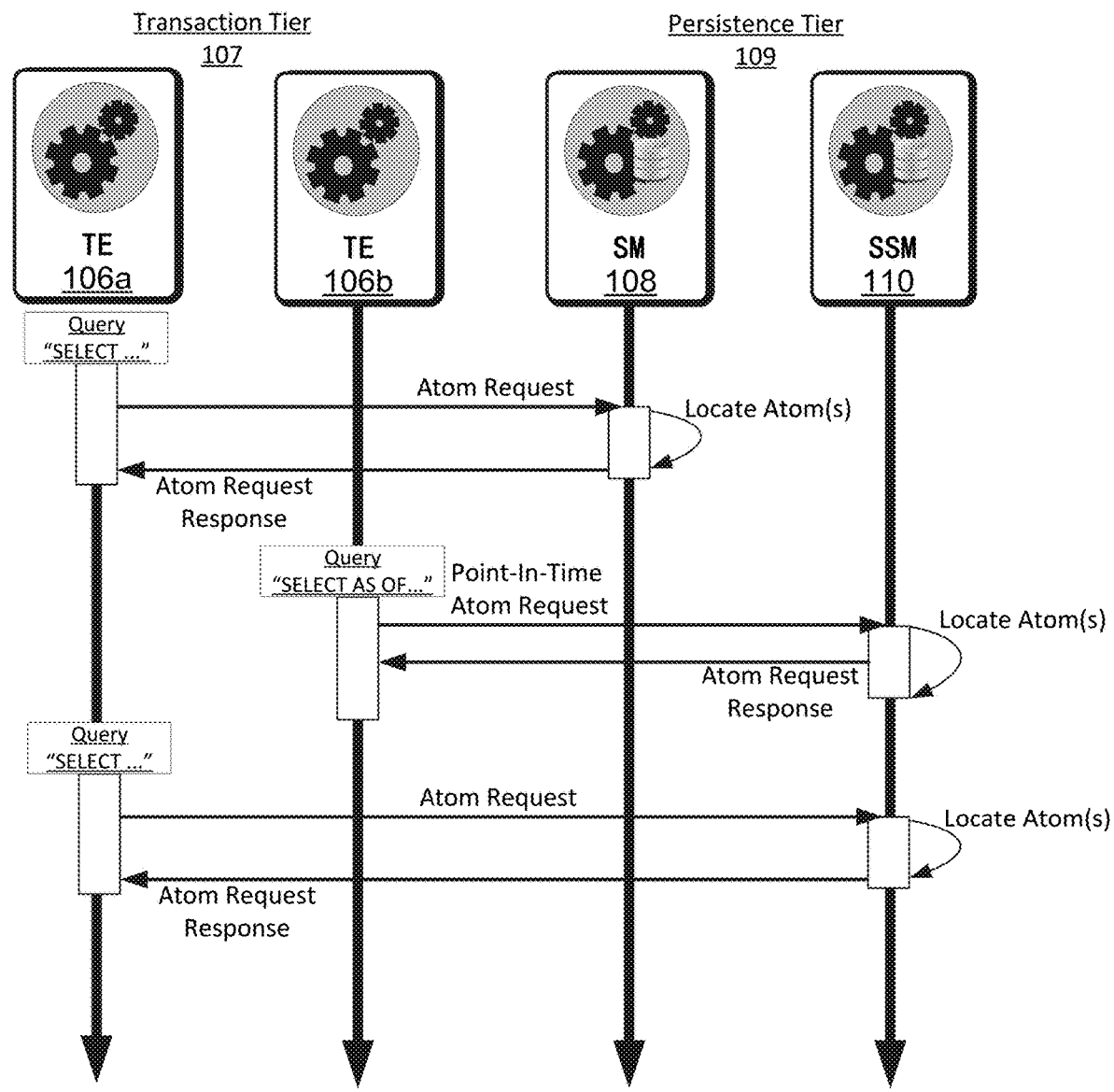
FIG. 8d shows an example data flow illustrating a plurality of TEs implementing the example point-in-time methodology of FIG. 8a, in accordance with an embodiment of the present disclosure.

Referring now to FIG. 8*d*, an example data flow illustrating a plurality of TEs implementing the example point-in-time methodology 800 of FIG. 8*a* is shown, in accordance with an embodiment of the present disclosure. As shown, each of the TEs 106*a* and 106*b* are configured enable a client (e.g., SQL client 102) to "view" a single, logical database within the distributed database system 100 and perform queries thereon. Also as shown, TE 106*a* is executing a query that includes standard SQL (e.g., "SELECT . . . ") and TE 106*b* is executing a second query that includes an additional SQL keyword ("as of") to perform a point-in-time query. Note, each of the TEs 106*a* and 106*b* are not limited to performing point-in-time queries to the exclusion of standard queries, and vice-versa. To this end, each of the TEs 106*a* and 106*b* can be configured to service both standard queries and point-in-time queries concurrently.

Within the example context of the standard query ("SELECT . . . ") executed by the TE 106*a*, one or more atoms are unavailable in the atom cache of the TE 106*a*. In an embodiment, such atom availability determinations can be performed similar to act 806 of the methodology of FIG. 8*a*. As a result, the TE 106*a* sends an atom request to SM 108. In response, the SM 108 retrieves the requested atoms from its atom cache or its durable storage and then transmits back the requested atoms to the TE 106*a*. However, it should be appreciated that virtually any database node in the transaction tier 107 and/or the persistence tier 109 could be utilized by the TE 106*a* as atoms can be requested from any peer node having the requested atom in a respective atom cache or durable storage, as the case may be. To this end, and in accordance with an embodiment, the TE 106*a* can receive a portion of atoms from a first database node and a second portion of atoms any number of additional database nodes. In such cases, retrieved atoms, and those atoms already present in the atom cache of the TE 106*a*, can be utilized to service the query and return a result set, similar to act 808 discussed above with regard to FIG. 8*a*.

Within the example context of the point-in-time query ("SELECT AS OF . . . ) executed by the TE 106*b*, one or more atoms are unavailable in the atom cache of the TE 106*b*. Recall that atoms are frozen prior to destructive replication procedures that remove atoms, or versions of atoms. So, a given point-in-time query may return only frozen atoms, or may return some frozen atoms and some current-state atoms. Further recall that SSMs store and update a current state of a database (e.g., utilizing replication messages). Accordingly, atoms may not be frozen if they are, for example, infrequently changed or otherwise not subject to space reclamation procedures for long periods of time.

In an embodiment, the TE 106*b* determines which atoms to request from the SSM 110, in part, by communicating with the SSM 110 to locate atoms related to the snapshot identified in the point-in-time query. Recall that the SSM leverages many of the modules of the SM architecture 201 as discussed above with regard to FIG. 2B. However, in certain embodiments an SSM includes additional modules to save multiple versions of each atom rather than just the current state (e.g., so-called "frozen" atoms) between snapshots. When an SSM receives replication messages, as discussed above with regard to FIGS. 7A-7C, those modifications result in saving past states in the SSM durable storage. The snapshot manager module 226 and the storage interface module 224 organize those snapshots as a sequence of previous versions of atoms, as discussed above with regard to FIG. 3*a*. To this end, and in accordance with an embodiment, portions of snapshots are reconstructed, on-demand, using these frozen atoms and the current state, as the case may be.

As will be appreciated, snapshots enable versions of a database to be "seen" to the exclusion of others utilizing a visibility routine as discussed above with regard to FIG. 2B. This enables the TE 106*b* to determine which atoms should be used to reconstruct the database to service the point-in-time query. In such embodiments, only the atoms related to the database objects pertinent to the query need to be loaded into the atom cache of the TE 106*b*. For example, a command to select from a particular table "as of" a particular point-in-time does not require each and every table at that point-in-time to be loaded. Instead, only those atoms used to reconstruct the particular table at the particular point-in-time are loaded by the TE 106*b*. In an embodiment, the TE 106*b* performs the visibility routine on those atoms needed to reconstruct the snapshot such that only those versions of each atom that were "current" as of the snapshot become visible.

Continuing the example data flow of FIG. 8*d*, once the TE 106*b* determines which atoms should be used to service the point-in-time query, as discussed above, the TE 106*b* requests those atoms from the SSM 110. In some cases, one or more of the requested atoms are "frozen" copies of atoms maintained by SSMs. In other cases, one or more of the requested atoms are current-state atoms that are made durable by not only SSMs, but by SMs as well. In any such cases, and as shown in FIG. 8*d*, the TE 106*b* can request the atoms necessary to service the point-in-time query by sending an atom request to the SM 108 or the SSM 110. In response, the SM 108 or the SSM 110 can determine if the requested atoms are in its respective atom cache, and if not, load those atoms by retrieving them from durable storage (e.g. durable storage locations 112 or 114). Once in the atom cache, the SSM 110 can send the requested atoms to the TE 106*b* through, for example, the communication network 101. In an embodiment, the TE 106*b* utilizes the received frozen and/or current-state atoms to perform a query and construct a result set containing results valid for the requested snapshot that can be returned to the client.

Computer System

Figure 9:
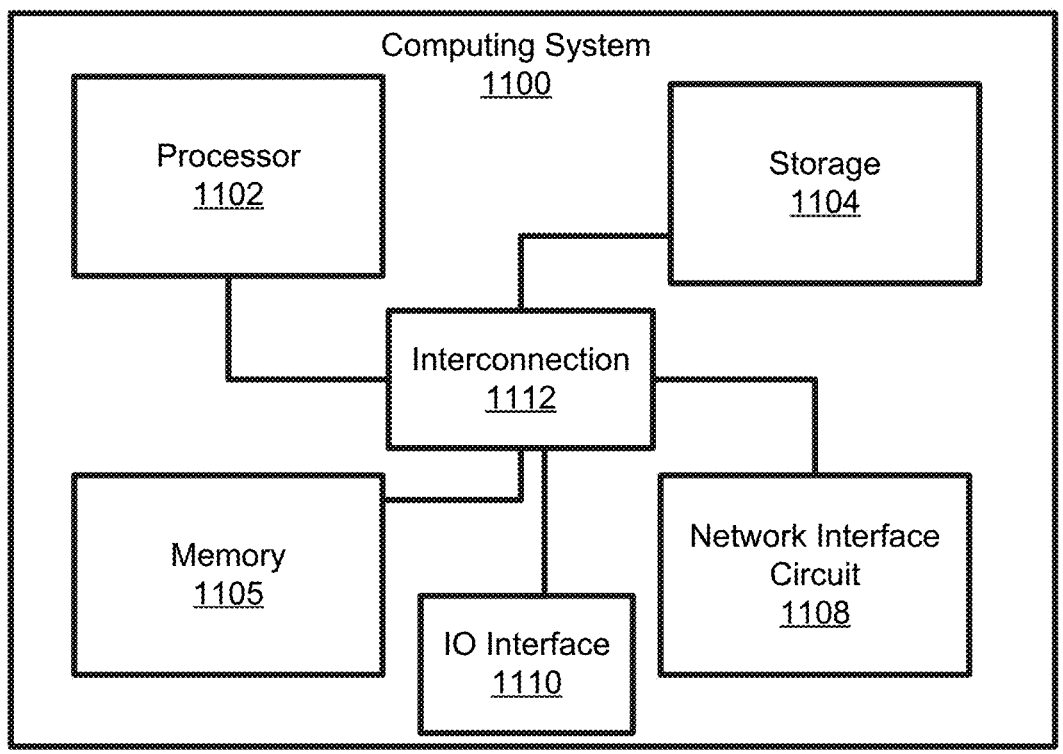
FIG. 9 shows a computing system configured in accordance with an embodiment of the present disclosure.

FIG. 9 illustrates a computing system 1100 configured to execute one or more nodes of the distributed database system 100, in accordance with techniques and aspects provided in the present disclosure. As can be seen, the computing system 1100 includes a processor 1102, a data storage device 1104, a memory 1105, a network interface circuit 1108, an input/output interface 1110 and an interconnection element 1112. To execute at least some aspects provided herein, the processor 1102 receives and performs a series of instructions that result in the execution of routines and manipulation of data. In some cases, the processor is at least two processors. In some such cases, the processor may be multiple processors or a processor with a varying number of processing cores. The memory 1106 may be RAM and configured to store sequences of instructions and other data used during the operation of the computing system 1100. To this end, the memory 1106 may be a combination of volatile and non-volatile memory such as dynamic random access memory (DRAM), static RAM (SRAM), or flash memory, etc. The network interface circuit 1108 may be any interface device capable of network-based communication. Some examples of such a network interface include an Ethernet, Bluetooth, Fibre Channel, Wi-Fi and RS-232 (Serial) interface. The data storage device 1104 includes any computer readable and writable non-transitory storage medium. The storage medium may have a sequence of instructions stored thereon that define a computer program that may be executed by the processor 1102. In addition, the storage medium may generally store data in contiguous and non-contiguous data structures within a file system of the storage device 1104. The storage medium may be an optical disk, flash memory, a solid state drive (SSD), etc. During operation, the computing system 1100 may cause data in the storage device 1104 to be moved to a memory device, such as the memory 1106, allowing for faster access. The input/output interface 1110 may comprise any number of components capable of data input and/or output. Such components may include, for example, a display device, a touchscreen device, a mouse, a keyboard, a microphone, and speakers. The interconnection element 1112 may comprise any communication channel or bus established between components of the computing system 1100 and operating in conformance with standard bus technologies such as USB, IDE, SCSI, PCI, etc.

Although the computing system 1100 is shown in one particular configuration, aspects and embodiments may be executed by computing systems with other configurations. Thus, numerous other computer configurations are within the scope of this disclosure. For example, the computing system 1100 may be a so-called "blade" server or other rack-mount server. In other examples, the computing system 1100 may implement a Windows®, or Mac OS® operating system. Many other operating systems may be used, and examples are not limited to any particular operating system.

Usage Examples

In one embodiment, an Administrator can cause a backup procedure to occur to backup one or more databases within the distributed database system 100. In this embodiment, the Administrator may access a user interface (e.g., hosted by an agent node 104) and initiate a backup procedure by selecting a snapshot that defines a point in time associated with the data to be backed up. In this embodiment, a query similar to the example query 803 of FIG. 8C may be utilized to acquire a list of available snapshots. In some cases, a recent or current version of the database may be desired. In these cases, the distributed database system 100 can be configured to automatically declare a snapshot, and thus, make a most-recent version of the database available for backup. In such cases, an Administrator can specify a snapshot to backup and a location to store the database. Some such example locations include USB thumb drives, external hard drives, raid arrays, relative paths, or any suitable storage location, as will be apparent in light of this disclosure. Once complete, the Administrator may receive a prompt, an email, or other suitable notification that indicates backup has completed. In an embodiment, the backup process is a background process. In an embodiment, the backup process can be paused and restarted at a later point without corrupting the backup. In another embodiment, an Administrator may backup a sequence of transactions since a particular snapshot (e.g., utilizing the write-ahead log) along with a snapshot in order to perform a fine-grained incremental backup copy.

In another embodiment, an Administrator can restore a database, or a portion thereof, after catastrophic durable storage loss or otherwise in order to perform data migrations. In this embodiment, the distributed database system 100 is in an "offline" state whereby no transactions are being committed to durable storage. In this embodiment, a backup may be retrieved from an external hard drive or other suitable location, as will be apparent in light of this disclosure. In an embodiment, the Administrator utilizes a software tool to copy a backup onto the physical storage that will be used by an SM. In some cases, the backup includes the files copied from a snapshot, and a set of changes since the snapshot (e.g., incremental changes), which can be utilized to restore a database to a desired point in time. In an embodiment, the database can be configured and started in a normal manner via an administration application or console. Once started, one or more SMs can be directed at the physical storage location that was populated utilizing the software tool. As a result, the SMs transition from offline to online, and thus enable subsequent transactions to be committed by one or more TEs.

In another embodiment, erroneous user changes to a database can be "rolled back" during live operation of a database within the distributed database system 100. This roll back procedure can be better understood by way of example. Consider a circumstance wherein a user erroneously deletes a table named "Accounts." In this example, a database Administrator can search for a recent snapshot that preceded the table deletion. One such example SQL statement that implements such a search is as follows:
SELECT max(id) FROM system_snapshots WHERE time<now( );

Once executed, the Administrator can use the result set to select a snapshot identifier ("id" in the above example) to select the data from the table prior to the deletion and recreate the table. For example, if "id" equals 3:
SELECT FROM Accounts INTO Accounts AS OF 3;

As a result of executing this example point-in-time query, a new Accounts table is created and inserted into the database including the data from the previously deleted Accounts table. Data representing the Accounts table will therefore be reintroduced into the current state of the database.

Additional usage scenarios utilizing the techniques variously disclosed herein should also be apparent in light of this disclosure. For example, consider a scenario in which an intrusion is detected that occurred 6 months prior to detection. In this circumstance, a user could query a snapshot from 6 months ago and generate a report on what users were logged into the system. Such a report could be manifested as a tabulated result set or as a formalized report (e.g., having graphics, headers, charts, graphs, and so on), depending on the configuration.

In another scenario, a long-running query could be executed that generates a historical summary view of a particular set of rows. For example, consider a database table labeled "assembly lines" that has a row corresponding to each assembly line for a number of factories located world-wide. Each assembly line row could include a column called "status" that, for example, has a value of red, yellow or green that indicates, at or near real-time, whether the assembly line is producing below a target efficiency, at a target efficiency, or above a target efficiency, respectively. To this end, one or more point-in-time queries could be performed that enable a historical view for each assembly line such that efficiency trends over a particular time frame could be visualized or otherwise reported on. For example, a one-month report could be run that shows a day-by-day view of the efficiency for each respective assembly line, or total efficiency for each factory.

In yet another example scenario, the distributed database system 100 keeps one year of daily snapshots for compliance reasons. In this example, a command or background process can be executed every day that removes all older snapshots to comply with in-place data retention policies. This avoids performance penalties caused by having to execute large queries that affect the current state of the database (e.g., delete operations). In addition, this avoids performance penalties caused by requiring examination of a large number of tables, and each row therein, to determine when each row update last occurred (e.g., using a timestamp column) in order to identify those records outside of the retention policy.

Further Example Embodiments

Example 1 is a system configured to store a database and a plurality of database snapshots in durable storage, the system comprising a network interface circuit configured to communicatively couple to a communication network, the communication network comprising a plurality of database nodes forming a distributed database, a memory for storing a plurality of database objects, each having a current version and a past version, and a snapshot manager module including a high-resolution archival mode configured to receive a database replication message via the communication network, and manipulate an identified database object in the memory based on the received database replication message, where the high-resolution archival mode is further configured to archive what had been the current version of the identified database object as a new past version and store a new current version in accordance with the database replication message, where the new current version and each of the past versions are associated with a snapshot identifier.

Example 2 includes the subject matter of Example 1, where the one or more replication messages are configured to synchronize database transactions such that a same database or portions thereof are stored in a memory within each of the plurality of database nodes, and where each replication message comprises data manipulation language (DML) and target database objects for that DML.

Example 3 includes the subject matter of Example 1, where the DML comprises structured query language (SQL) compliant syntax.

Example 4 includes the subject matter of Examples 1-3, where each database object represents at least one of a database table, a database record, a database blob, and a database index.

Example 5 includes the subject matter of Examples 1-4, where the high-resolution archival mode is further configured to receive a destructive replication message identifying a past version for removal from a database object stored in the memory, in response to receiving the destructive replication message, copy the identified past version of the database object into a frozen read-only copy of the database object, and store the frozen read-only copy of the database object into the memory and remove the identified past version from the database object in the memory.

Example 6 includes the subject matter of Example 5, where the destructive replication messages is configured to synchronize removal of past versions of database objects such that a same number of database object versions for each database object persists in each database, or portion thereof, stored in a memory of each of the plurality of database nodes.

Example 7 includes the subject matter of Example 5, where the durable storage comprises a non-volatile storage location, where the high-resolution archival mode is configured to commit the frozen read-only copy of the database object into the non-volatile storage location.

Example 8 includes the subject matter of Example 7, where the non-volatile storage location comprises a relative path or other identifier of at least one of a local hard drive, raid array, and a network-attached storage location associated with the system.

Example 9 includes the subject matter of Example 1, where the high-resolution archival mode is further configured to receive, from a database node of the plurality of database nodes, a request for one or more database objects stored in the memory, where the requested database objects are associated with a previously executed transaction and collectively represent a consistent state of the database, or portion thereof, at the time the previously executed transaction was committed, and send the one or more requested database objects to the database node via the communication network.

Example 10 includes the subject matter of Example 9, where at least one database object of the one or more database objects comprises a frozen read-only copy of a database object, where the frozen read-only copy of the database object was created and stored in the memory after a destructive replication was received by the high-resolution archival mode.

Example 11 includes the subject matter of Examples 1-10, where the distributed database provides a single, logical view to a database client such that write operations affecting the database are synchronized to the plurality of database nodes.

Example 12 includes the subject matter of Example 11, where the distributed database system implements Atomicity, Consistency, Isolation, and Durability (ACID) properties.

Example 13 is a non-transitory computer-readable medium having a plurality of instructions encoded thereon that when executed by at least one processor cause a high-resolution archival process to be performed, the process being configured to receive a database replication message via a communication network, the communication network comprising a plurality of communicatively coupled database nodes forming a distributed database, manipulate an identified database object in the memory based on the received database replication message, archive what had been the current version of the identified database object as a new past version and store a new current version in accordance with the database replication message, and store the new current version and past versions of the database object in a durable store location, where the new current version and each of the past versions are associated with a snapshot identifier.

Example 14 includes the subject matter of Example 13, where the process is further configured to receive a destructive replication message identifying a past version to remove from a database object stored in a memory, in response to receiving the destructive replication message, copy the identified past version of the database object into a frozen read-only copy of the database object, and store the frozen read-only copy of the database object into the memory and remove the identified past version from the database object in the memory.

Example 15 includes the subject matter of Examples 13-14, where the process is further configured to receive, from a database node of the plurality of database nodes, a request for one or more database objects stored in the memory, where the requested database objects are associated with a previously executed transaction and collectively represent a consistent state of the database, or portion thereof, at the time the previously executed transaction was committed, and send the one or more requested database objects to the database node via the communication network.

Example 16 includes the subject matter of Example 15, where at least one database object of the one or more database objects comprises a frozen ready-only copy of a database object, where the frozen read-only copy of the database object was created and stored in a memory after a destructive replication was received from a node of the plurality of database nodes.

Example 17 is a computer-implemented method for backup and restore of a database using database snapshots, the method comprising identifying, by a processor, a snapshot from a plurality of snapshots, each snapshot being associated with a previously committed database transaction and logically representing a consistent state of the database at the time the previously committed database transaction was committed, requesting a plurality of database objects associated with the identified snapshot, and reconstructing, in a memory, a past state of the database corresponding to the identified snapshot.

Example 18 includes the subject matter of Example 17, the method further comprising storing the reconstructed past state in a desired storage location, where the desired storage location is at least one of a USB thumb drive, a hard drive, a raid array, an external hard drive, and a network-attached storage device.

Example 19 includes the subject matter of Examples 17-18, the method further comprising using the reconstructed past state to undue a previous database write operation on a live database, where the write operation was caused by least one of an UPDATE, INSERT, DELETE, and DROP SQL statement.

Example 20 includes the subject matter of Example 17-19, the method further comprising copying the reconstructed past state to a durable storage of a database node, where the database node instantiates the past state as a live database such that reads and writes can be performed.

The foregoing description has been presented for the purposes of illustration and description. It is not intended to be exhaustive or to limit the disclosure to the precise form disclosed. It is intended that the scope of the disclosure be limited not by this detailed description, but rather by the claims appended hereto.

What is claimed is:

1. A system configured to store a database and a plurality of database snapshots in durable storage, the system comprising:
  a network interface circuit configured to communicatively couple to a communication network, the communication network comprising a plurality of database nodes forming a distributed database;

a memory for storing a plurality of data structures in the distributed database, each data structure in the plurality of data structures including a current version of a corresponding database object and at least one past version of the corresponding database object;

a processor communicatively coupled to the memory and configured to commit a database transaction manipulating a database object in a data structure in the plurality of data structures; and a snapshot manager module configured to:
- in response to the database transaction being committed, declare a snapshot representing a point-in-time state of the distributed database, the point-in-time state providing a view of the database object prior to committing a subsequent database transaction manipulating the database object,
- receive a destructive replication message via the communication network, the destructive replication message identifying a past version of the database object to remove from the data structure,
- in response to receiving the destructive replication message, create a frozen read-only copy of the data structure prior to applying the destructive replication message, the frozen read-only copy of the data structure including the past version of the database object,
- after creating the frozen read-only copy of the data structure, apply the destructive replication message to remove the past version of the database object from the data structure,
- associate the frozen read-only copy of the data structure with the snapshot of the distributed database, the frozen read-only copy of the data structure logically replacing a copy of the data structure in the snapshot of the distributed database, and
- perform a point-in-time query against the snapshot, the point-in-time query returning the past version of the database object from the frozen read-only copy of the data structure.

2. The system of claim 1, wherein the destructive replication message comprises data manipulation language (DML) and target database objects for that DML.

3. The system of claim 2, wherein the DML comprises structured query language (SQL) compliant syntax.

4. The system of claim 1, wherein each database object in the plurality of database objects represents at least one of a database table, a database record, a database blob, and a database index.

5. The system of claim 1, wherein the destructive replication message is configured to synchronize removal of past versions of database objects such that a same number of database object versions for each database object persists in each database, or portion thereof, stored in a memory of each of the plurality of database nodes.

6. The system of claim 1, wherein the durable storage comprises a non-volatile storage location, wherein the snapshot storage module is configured to commit the frozen read-only copy of the database object into the non-volatile storage location.

7. The system of claim 6, wherein the non-volatile storage location comprises a relative path or other identifier of at least one of a local hard drive, redundant array of independent disks, and a network-attached storage location associated with the system.

8. The system of claim 1, wherein the snapshot storage manager is further configured to:

receive, from a database node of the plurality of database nodes, a request for one or more database objects stored in the memory, wherein the requested database objects are associated with a previously executed transaction and collectively represent a consistent state of the database, or portion thereof, at the time the previously executed transaction was committed; and send the one or more requested database objects to the database node via the communication network.

9. The system of claim 1, wherein the distributed database provides a single, logical view to a database client such that write operations affecting the database are synchronized to the plurality of database nodes.

10. The system of claim 9, wherein the distributed database implements Atomicity, Consistency, Isolation, and Durability (ACID) properties.

11. A non-transitory computer-readable medium having a plurality of instructions encoded thereon that when executed by at least one processor cause a high-resolution archival process to be performed, the process being configured to:
- in response to a database transaction that manipulates a database object being committed, declare a snapshot representing a point-in-time state of a distributed database, the point-in-time state providing a view of the database object prior to committing a subsequent database transaction manipulating the database object;
- receive a destructive replication message via a communication network, the communication network comprising a plurality of communicatively coupled database nodes forming the distributed database, the destructive replication message identifying a past version of the database object to remove from a data structure stored in the distributed database, the data structure storing a current version of the database object and the past version of the database object;
- in response to receiving the destructive replication message, create a frozen read-only copy of the data structure prior to applying the destructive replication message,
- associating the frozen read-only copy of the data structure with the snapshot of the distributed database, the frozen read-only copy of the data structure including the past version of the database object;
- after creating the frozen read-only copy of the database object, apply the destructive replication message to remove the past version of the database object from the data structure,
- associating the frozen read-only copy of the data structure with the snapshot of the distributed database, the frozen read-only copy of the data structure logically replacing a copy of the data structure in the snapshot of the distributed database; and
- perform a point-in-time query against the snapshot, the point-in-time query returning the past version of the database object from the frozen read-only copy of the data structure.

12. The computer-readable medium of claim 11, wherein the process is further configured to:

receive, from a database node of the plurality of database nodes, a request for one or more database objects stored in the memory, wherein the requested database objects are associated with a previously executed transaction and collectively represent a consistent state of the database, or portion thereof, at the time the previously executed transaction was committed; and send the one or more requested database objects to the database node via the communication network.

\* \* \* \* \*